(12) United States Patent
Sokolovski et al.

(10) Patent No.: US 11,042,314 B2
(45) Date of Patent: Jun. 22, 2021

(54) GENERATION, VALIDATION AND IMPLEMENTATION OF STORAGE-ORCHESTRATION STRATEGIES USING VIRTUAL PRIVATE ARRAY (VPA) IN A DYNAMIC MANNER

(71) Applicant: THE SILK TECHNOLOGIES ILC LTD., Yokne'am Ilit (IL)

(72) Inventors: Adik Sokolovski, Kiryat Tivon (IL); Eyal Gordon, Haifa (IL); Gilad Hitron, Haifa (IL); Benjamin Noam Bondi, Sde Yaakov (IL); Guy Lorman, Kfar Saba (IL)

(73) Assignee: THE SILK TECHNOLOGIES ILC LTD, Yokne'am Ilit (IL)

( * ) Notice: Subject to any disclaimer, the term of this patent is extended or adjusted under 35 U.S.C. 154(b) by 0 days.

(21) Appl. No.: 16/521,379

(22) Filed: Jul. 24, 2019

(65) Prior Publication Data
US 2020/0042212 A1 Feb. 6, 2020

Related U.S. Application Data

(60) Provisional application No. 62/712,286, filed on Jul. 31, 2018.

(51) Int. Cl.
*G06F 3/06* (2006.01)
*H04L 29/08* (2006.01)
*G06F 11/34* (2006.01)

(52) U.S. Cl.
CPC .......... *G06F 3/0631* (2013.01); *G06F 3/0604* (2013.01); *G06F 3/067* (2013.01); *G06F 11/3466* (2013.01); *H04L 67/1097* (2013.01)

(58) Field of Classification Search
CPC .... G06F 3/0604; G06F 3/067; G06F 11/3466; H04L 67/1097
See application file for complete search history.

(56) References Cited

U.S. PATENT DOCUMENTS

| | | | | |
|---|---|---|---|---|
| 7,774,444 B1* | 8/2010 | George | ............... | H04L 67/1097 709/217 |
| 2012/0197624 A1* | 8/2012 | Hawargi | ................. | G06F 3/067 703/21 |

OTHER PUBLICATIONS

International Data Corporation (IDC), "Using NVMe Performance to Enable Storge Infrastructure Composability," IDC Technology Spotlight, Oct. 2017.

(Continued)

*Primary Examiner* — Tammara R Peyton
(74) *Attorney, Agent, or Firm* — Wiggin and Dana LLP; Gregory S. Rosenblatt; Thomas M. Landman

(57) ABSTRACT

A data storage management layer comprises computing device(s), operatively connected to storage resources, which comprise data storage units and control units. The data storage management layer is operatively connected to the storage resources. They are operatively connected to host computers. A sub-set of the storage resources are assigned to each host, in order to provide storage services according to performance requirements predefined for the host, thereby generating Virtual Private Arrays (VPA). The computing device(s) are configured to perform a method of managing the data storage system comprising: (a) implement storage management strategies, comprising rules. The rules comprise conditions and actions. The actions are capable of improving VPA performance in a dynamic manner; (b) repetitively performing: (i) monitor VPA performance for detection of compliance of VPA with the condition(s); and (ii) responsive to detection of compliance of VPA with the condition(s), performing the action(s).

46 Claims, 12 Drawing Sheets

(56) References Cited

OTHER PUBLICATIONS

Kaminario.com press release, "Kaminario Announces New Class of All-flash Storage Solutions Based on NVMe Kaminario K2.N and Kaminario Flex provide a composable storage infrastructure delivering increased performance, scalability and extreme agility for private cloud environments" (Aug. 8, 2017), https://kaminario.com/company/news-and-press/press-releases/nvme-and-sofware-orchestration-announcement-2/.

Wikipedia.org, "NMV Express" (Jul. 9, 2018), archived on Jul. 15, 2018 at https://web.archive.org/web/20180715111411/https://en.wikipedia.org/wiki/NVM_Express.

\* cited by examiner

ΩGENERATION, VALIDATION AND IMPLEMENTATION OF STORAGE-ORCHESTRATION STRATEGIES USING VIRTUAL PRIVATE ARRAY (VPA) IN A DYNAMIC MANNER

TECHNICAL FIELD

The presently disclosed subject matter relates to data storage systems, and more particularly to data storage systems utilizing communication networks.

BACKGROUND

Non-Volatile Memory Express (NVMe) is a storage interface technology that offers performance and efficiency advantages over, for example, the Small Computer System Interface (SCSI) protocol. NVMe is a lighter-weight protocol that is specifically designed for non-volatile storage media such as flash, rather than spinning disk media, to capitalize on the low latency and internal parallelism of solid-state storage devices.

NVM Express over Fabrics (NVMeOF) extends the NVME interface to various networked interfaces that use transport protocols such as, for example, Fiber Channel, TCP/IP or InfiniBand.

SUMMARY

According to a first aspect of the presently disclosed subject matter there is provided a computer-implemented method of managing a data storage system, the data storage system comprising a plurality of storage resources and at least one data storage management layer operatively connected therebetween over at least one communication network, the plurality of storage resources comprising at least one data storage unit and at least one control unit, the at least one the at least one data storage management layer comprised in, or otherwise operatively connected to, the plurality of storage resources, data storage management layer comprised in otherwise operatively connected to the plurality of storage resources, the at least one data storage management layer and the at least one control unit operatively connected over the at least one communication network to at least one host computer device, wherein a sub-set of the plurality of storage resources are assigned to the at least one host, in order to provide storage services thereto according to performance requirements predefined for the at least one host, thereby generating at least one Virtual Private Array (VPA) associated with the at least one host,
the method comprising, using a processing circuitry of the at least one data storage management layer for:
(a) implementing at least one storage management strategy, comprising at least one rule, the at least one rule comprising at least one condition and at least one action, the at least one action capable of improving VPA performance of data resources in a dynamic manner; and
(b) repetitively performing the following:
  i) monitoring performance of the VPA for detection of compliance of the VPA with the at least one condition; and
  ii) responsive to detection of compliance of the VPA with the at least one condition, performing the at least one action capable of improving of the VPA performance.

In some examples of the first aspect of the presently disclosed subject matter, the a least one action capable of improving VPA performance is performed autonomously. In some examples of the first aspect of the presently disclosed subject matter, the at least one action comprises at least one resources re-assignment action, the at least one resources re-assignment action comprising re-assignment of at least one of: the at least one control unit; and the at least one data storage unit.

In addition to the above features, the method according to this aspect of the presently disclosed subject matter can include one or more of features (i) to (xvii) listed below, in any desired combination or permutation which is technically possible:

(i) Wherein improving the VPA performance comprises at least one of: decreasing read-write latency; increasing Input/Output Operations per Second (TOPS); increasing throughput; increase free physical capacity; increase free logical capacity; increase data reduction ratio; decreasing CPU utilization; decreasing storage utilization; and decreased utilization of the at least one communications network.

(ii) Wherein the at least one action comprises at least one resources re-assignment action, the at least one resources re-assignment action comprising re-assignment of at least one of: the at least one control unit; and the at least one data storage unit.

(iii) Wherein the at least one resources re-assignment action comprises:
  i. generating at least one computer instruction for the at least one resources re-assignment action; and
  ii. sending the at least one computer instruction to the at least one control unit associated with the at least one host, for causing the control unit to execute the re-assignment action.

(iv) Wherein the at least one resources re-assignment action comprises at least one of: re-assigning at least one unit of the plurality of storage resources from the at least one VPA to a free pool; re-assigning the at least one unit from the free pool to the at least one VPA; and re-assigning the at least one unit from the at least one VPA to at least one other VPA.

(v) Wherein the at least one resources re-assignment action comprises a determination of a number of data storage units to re-assign, a determination of a number of control units to re-assign and a determination of an identity of the at least one other VPA.

(vi) Wherein the at least one resources re-assignment action comprises increasing the sub-set of the plurality of storage resources assigned to the at least one host.

(vii) Wherein the at least one resources re-assignment action comprises decreasing the sub-set of the plurality of storage resources assigned to the at least one host.

(viii) Wherein the at least one resources re-assignment action comprises generating updated topology information characterizing the at least one VPA.

(ix) Wherein the at least action comprises at least one of sending an alert to a control center, sending a communication to the at least one host, and performing an action to re-configure the at least one communication network.

(x) Wherein the at least one condition comprises a time-based condition.

(xi) Wherein the at least one condition is based on at least one of: read-write latency; Input/Output Operations per Second (TOPS); throughput; physical capacity; logical; data reduction ratio; CPU utilization; storage utilization; and utilization of the at least one communications network.

(xii) Wherein the at least one communications network is at least one of an Ethernet and an NVME over Fabric network.

(xiii) Wherein the a least one action capable of improving VPA performance is performed in response to confirmation by an operator.

(xiv) Wherein step (b) further comprises: in response to the data storage management layer receiving at least one storage management strategy update, comprising at least one updated rule, the at least one updated rule comprising at least one updated condition and at least one updated action capable of improving the VPA performance in a dynamic manner, monitoring the VPA performance for detection of compliance of the VPA with the at least one updated condition.

(xv) Wherein the at least one storage management strategy comprises at least one manually-input storage management strategy.

(xvi) Wherein performing the at least one action capable of improving the VPA performance comprises:
  i) choosing at least one candidate action of the at least one action;
  ii) determining whether the at least one candidate action can be implemented; and
    (1) in response to a determination that the at least one candidate action can be implemented, performing the at least one candidate action.

(xvii) Wherein the step (a) comprising:
(c) receiving at least one requirement of the at least one VPA;
(d) receiving historical performance data, which is indicative of the past performance of the at least one VPA;
(e) analyzing the historical performance data of the VPA, based on the at least one requirement of a VPA;
(f) generating, based on the analysis, at least one storage management strategy, comprising at least one rule, the at least one rule comprising at least one condition and at least one action capable of improving the VPA performance in a dynamic manner, wherein each storage management strategy of the at least one storage management strategy is indicative of a requirement of the least one requirement.

According to a second aspect of the presently disclosed subject matter there is provided a computer-implemented method of generating data storage strategies for a data storage management system, the data storage system comprising a plurality of storage resources and at least one data storage management layer operatively connected over at least one communication network, the plurality of storage resources comprising at least one data storage unit and at least one control unit, the at least one data storage management layer comprised in, or otherwise operatively connected to, the plurality of storage resources, the at least one data storage management layer and the at least one control unit operatively connected over the at least one communication network to at least one host computer device, wherein a sub-set of the plurality of storage resources are assigned to the at least one host, in order to provide storage services thereto according to performance requirements predefined for the at least one host, thereby generating at least one Virtual Private Array (VPA) associated with the at least one host, the sub-set comprising the at least one control unit and the at least one data storage unit, the method comprising, using a processing circuitry of the at least one data storage management layer for:
(a) receiving at least one requirement of the at least one VPA;
(b) receiving historical performance data, which is indicative of the past performance of the at least one VPA;
(c) analyzing the historical performance data, based on the at least one requirement of a VPA;
(d) generating, based on the analysis, at least one storage management strategy, comprising at least one rule, the at least one rule comprising at least one condition and at least one action capable of improving the VPA performance in a dynamic manner, wherein each storage management strategy of the at least one storage management strategy is indicative of a requirement of the least one requirement; and
(e) output the at least one storage management strategy, wherein the at least one storage management strategy is capable of being utilized by the at least one data storage management layer to perform an action to implement the at least one storage management strategy in the data storage management system in a dynamic manner.

In addition to the above features, the method according to this aspect of the presently disclosed subject matter can include one or more of features (xviii) to (xxxiii) listed below, in any desired combination or permutation which is technically possible:

(xviii) Wherein the analysis of the historical performance data, and the generation of the at least one storage management strategy, are performed utilizing machine learning.

(xix) Wherein the at least one requirement of a VPA is time-dependent.

(xx) Wherein the at least one requirement of a VPA is indicative of at least one Service Level Agreement (SLA), wherein the at least one requirement of a VPA is indicative of at least one of a storage service performance requirement and a resource utilization requirement.

(xxi) Wherein the method further comprising receiving at least one initial storage management strategy,
wherein the analysis of the historical performance data is based on the at least one initial storage management strategy, wherein the generating of the at least one storage management strategy is based on the at least one initial storage management strategy.

(xxii) Wherein the analysis, and the generating of the storage management strategy, are based on requirements of one VPA of the at least one VPA.

(xxiii) Wherein the analysis, and the generating of the storage management strategy, are based on requirements of all VPAs of the at least one VPA, wherein the at least one storage management strategy comprises at least one storage management strategy that addresses the requirements of all VPAs of the at least one VPA.

(xxiv) Wherein the at least one storage management strategy comprises an ordered set of storage management strategies, wherein the ordered set is ordered from a highest-priority storage management strategy to a lowest-priority storage management strategy.

(xxv) Wherein the method further comprising receiving at least one enrichment data parameter, wherein the analyzing of historical performance data is based on the at least one enrichment data parameter, and the generating of the at least one storage management strategy is indicative of the at least one enrichment data parameter.

(xxvi) Wherein the at least one enrichment data parameter is indicative of a pre-defined time-based event.

(xxvii) Wherein the at least one enrichment data parameter is a machine-learned parameter.

(xxviii) Wherein the analyzing of the historical performance data is based on topology information characterizing the at least one VPA.

(xxix) Wherein the method further comprising receiving at least one interrupt event enrichment data parameter, wherein the analyzing of historical performance data is based on the at least one interrupt event enrichment data parameter, and the generating of the at least one storage management strategy is indicative of the at least one interrupt event enrichment data parameter.

(xxx) Wherein the at least one interrupt event enrichment data parameter is indicative of an event occurring in one of real-time and near-real-time.

(xxxi) Wherein the method further comprising:

(f) repetitively performing the following:
  i) receiving at least one update of the historical performance data; and
  ii) performing the steps (c) through (e), wherein the analyzing of the historical performance data is based on the at least one update, and the generating of the at least one storage management strategy is indicative of the at least one update of the historical performance data, wherein the generating of the at least one storage management strategy comprises at least one of generating at least one new storage management strategy and generating at least one storage management strategy update, and setting the at least one of the at least one new storage management strategy and the at least one storage management strategy update to constitute the at least one storage management strategy, wherein the at least one storage management strategy update comprises at least one updated rule, the at least one updated rule comprising at least one updated condition and at least one updated action.

(xxxii) Wherein the method further comprising:

(g) repetitively performing the following:
  i) monitoring the VPA performance for detection of compliance of the VPA with the at least one condition of the at least one storage management strategy; and
  ii) responsive to detection of compliance of the VPA with the at least one condition, performing the at least one action capable of improving the VPA performance.

(xxxiii) Wherein after the step (d) and prior to the step (e), performing the following:

(h) setting the at least one storage management strategy to constitute at least one proposed storage management strategy (f) simulating a historical performance history based on the historical performance data to generate modified historical performance data, wherein the simulation comprises applying the at least one proposed storage management strategy to the historical performance data;

(g) calculating time-dependent performance parameters of the VPA indicative of the modified historical performance data;

(h) comparing the time-dependent performance parameters of the VPA indicative of the modified historical performance data to the at least one requirement of the at least one VPA;

(i) in response to the time-dependent performance parameters of the VPA indicative of the modified historical performance data meeting the at least one requirement of the at least one VPA,
  i) outputting a report indicating verification of the validity of the at least one proposed storage management strategy; and
  ii) setting the at least one proposed storage management strategy to constitute at least one storage management strategy; and (j) in response to the time-dependent performance parameters of the VPA indicative of the modified historical performance data not meeting the at least one requirement of the at least one VPA,
  i) generating a report indicating non-validity of the at least one proposed storage management strategy; and
  repeating the steps (e) and (f), wherein the analysis and the generation of the at least one storage management strategy are based on the report indicating non-validity of the at least one proposed storage management strategy, wherein the generation of the at least one storage management strategy comprises at least one of generating at least one new storage management strategy and generating at least one least storage management strategy update, and setting the at least one of the at least one new storage management strategy and the at least one least storage management strategy update to constitute the at least one storage management strategy.

(xxxiv) wherein the simulating the historical performance history is performed utilizing machine learning.

According to a third aspect of the presently disclosed subject matter there is provided a computer-implemented method of managing a data storage management system, the data storage system comprising a plurality of storage resources and at least one data storage management layer operatively connected over at least one communication network, the plurality of storage resources comprising at least one data storage unit and at least one control unit, the at least one data storage management layer comprised in, or otherwise operatively connected to, the plurality of storage resources, the at least one data storage management layer and the at least one control unit operatively connected over the at least one communication network to at least one host computer device, wherein a sub-set of the plurality of storage resources are assigned to the at least one host, in order to provide storage services thereto according to performance requirements predefined for the at least one host, thereby generating at least one Virtual Private Array (VPA) associated with the at least one host, the method comprising, using a processing circuitry of the at least one data storage management layer for:

(a) receiving at least one requirement of the at least one VPA;

(b) receiving historical performance data, which is indicative of the past performance of the at least one VPA;

(c) analyzing the historical performance data, based on the at least one requirement of a VPA;

(d) generating, based on the analysis, least one storage management strategy, comprising at least one rule, the at least one rule comprising at least one condition and at least one action, wherein each storage management strategy of the at least one storage management strategy is indicative of a requirement of the least one requirement, the at least one storage management strategy constituting an at least one storage management strategy;

(e) repetitively performing the following:
  i) monitoring the VPA performance for detection of compliance of the VPA with the at least one condition; and
  ii) responsive to detection of compliance of the VPA with the at least one condition, performing the at least one action capable of improving the VPA performance.

In some examples of the third aspect of the presently disclosed subject matter, the a least one action capable of improving the VPA performance is performed autonomously. In some examples of the first aspect of the presently disclosed subject matter, the at least one action comprises at least one resources re-assignment action, the at least one resources re-assignment action comprising re-assignment of at least one of: the at least one control unit; and the at least one data storage unit.

This aspect of the disclosed subject matter can optionally include one or more of features (i) to (xxxiii) listed above, mutatis mutandis, and feature (xxxv) listed below, in any desired combination or permutation which is technically possible:

(xxxv) Wherein after the step (d) and prior to the step (e), performing the following:
(h) setting the at least one storage management strategy to constitute at least one proposed storage management strategy
(i) simulating a historical performance history based on the historical performance data to generate modified historical performance data, wherein the simulation comprises applying the at least one proposed storage management strategy to the historical performance data;
(j) calculating time-dependent performance parameters of the VPA indicative of the modified historical performance data;
(k) comparing the time-dependent performance parameters of the VPA indicative of the modified data historical performance data to the at least one requirement of the at least one VPA;
(l) in response to the time-dependent performance parameters of the VPA indicative of the modified historical performance data meeting the at least one requirement of the at least one VPA,
  iii) outputting a report indicating verification of the validity of the at least one proposed storage management strategy; and
  iv) setting the at least one proposed storage management strategy to constitute at least one storage management strategy; and
(m) in response to the time-dependent performance parameters of the VPA indicative of the modified historical performance data not meeting the at least one requirement of the at least one VPA,
  i) generating a report indicating non-validity of the at least one proposed storage management strategy; and
  ii) repeating the steps (c) and (d), wherein the analysis and the generation of the at least one storage management strategy are based on the report indicating non-validity of the at least one proposed storage management strategy, wherein the generation of the at least one storage management strategy comprises at least one of generating at least one new storage management strategy and generating at least one least storage management strategy update, and setting the at least one of the at least one new storage management strategy and the at least one least storage management strategy update to constitute the at least one storage management strategy.

According to a fourth aspect of the presently disclosed subject matter there is provided computer-implemented method of managing a data storage management system, the data storage system comprising a plurality of storage resources and at least one data storage management layer operatively connected over at least one communication network, the plurality of storage resources comprising at least one data storage unit and at least one control unit, the at least one data storage management layer comprised in, or otherwise operatively connected to, the plurality of storage resources, the at least one data storage management layer and the at least one control unit operatively connected over the at least one communication network to at least one host computer device, wherein a sub-set of the plurality of storage resources are assigned to the at least one host, in order to provide storage services thereto according to performance requirements predefined for the at least one host, thereby generating at least one Virtual Private Array (VPA) associated with the at least one host, the method comprising, using a processing circuitry of the at least one data storage management layer for:
(a) receiving at least one requirement of the at least one VPA;
(b) receiving historical performance data, which is indicative of the past performance of the at least one VPA;
(c) analyzing the historical performance data, based on the at least one requirement of a VPA;
(d) generating, based on the analysis, least one storage management strategy, comprising at least one rule, the at least one rule comprising at least one condition and at least one action, wherein each storage management strategy of the at least one storage management strategy is indicative of a requirement of the least one requirement, the at least one storage management strategy constituting an at least one storage management strategy;
(e) repetitively performing the following: in response to receiving at least one update of the historical performance data, performing the steps (d) through (e), wherein the analyzing of the historical performance data based on the at least one update, and the generation of the at least one storage management strategy is indicative of the at least one update of the historical performance data e, wherein the generation of the at least one storage management strategy comprises at least one of generating at least one new storage management strategy and generating at least one storage management strategy update, and setting the at least one of: the at least one new storage management strategy; the at least one storage management strategy update, to constitute the at least one storage management strategy, wherein the at least one storage management strategy update comprises at least one updated rule, the at least one updated rule comprising at least one updated condition and at least one updated action.
(f) repetitively performing the following:
  i) monitoring the VPA performance for detection of compliance of the VPA with the at least one condition; and
  ii) responsive to detection of compliance of the VPA with the at least one condition, performing the at least one action capable of improving the VPA performance;
(g) in response to generation of the at least one of: the at least one new storage management strategy, comprising at least one new rule, the at least one new rule comprising at least one new condition and at least one new action; the at least one storage management strategy update, comprising at least one updated rule, the at least one updated rule comprising at least one updated condition and at least one updated action, performing step (g), wherein at least one of the at least one new condition and the at least one updated condition constitute the at least one condition, wherein at least one of the at least one new action and the at least one updated action constitute the at least one action capable of improving the VPA performance.

In some examples of the fourth aspect of the presently disclosed subject matter, the a least one action capable of improving the VPA performance is performed autonomously. In some examples of the first aspect of the presently disclosed subject matter, the at least one action comprises at least one resources re-assignment action, the at least one resources re-assignment action comprising re-assignment of at least one of: the at least one control unit; and the at least one data storage unit.

This aspect of the disclosed subject matter can optionally include one or more of features (i) to (xxxv) listed above, mutatis mutandis, in any desired combination or permutation which is technically possible:

According to a fifth aspect of the presently disclosed subject matter there is provided a computer-implemented method of managing a data storage system, the data storage system comprising a plurality of storage resources and at least one data storage management layer operatively connected over at least one communication network, the plurality of storage resources comprising at least one data storage unit and at least one control unit, the at least one data storage management layer comprised in, or otherwise operatively connected to, the plurality of storage resources, the at least one data storage management layer and the at least one control unit operatively connected over the at least one communication network to at least one host computer device, wherein a sub-set of the plurality of storage resources are assigned to the at least one host, in order to provide storage services thereto according to performance requirements predefined for the at least one host, thereby generating at least one Virtual Private Array (VPA) associated with the at least one host, the method comprising, using a processing circuitry of the at least one data storage management layer for:

(a) receiving at least one proposed storage management strategy;
(b) receiving at least one requirement of the at least one VPA;
(c) receiving historical performance data, which is indicative of the past performance of the at least one VPA;
(d) simulating a historical performance history based on the historical performance data e to generate modified historical performance data, wherein the simulation comprises applying the at least one proposed storage management strategy to the historical performance data;
(e) calculating time-dependent performance parameters of the VPA indicative of the modified historical performance data;
(f) comparing the time-dependent performance parameters of the VPA indicative of the modified historical performance data to the at least one requirement of the at least one VPA;
(g) in response to the time-dependent performance parameters of the VPA indicative of the modified historical performance data meeting the at least one requirement of the at least one VPA,
  i) generating a report indicating verification of validity of the at least one proposed storage management strategy; and
  ii) setting the at least one proposed storage management strategy to constitute at least one verified storage management strategy,
    wherein the at least one verified storage management strategy is capable of being utilized by the at least one data storage management layer to perform an action to implement the at least one verified storage management strategy in the data storage management system in a dynamic manner.

In addition to the above features, the method according to this aspect of the presently disclosed subject matter can include one or more of features (xxxvi) to (xlii) listed below, in any desired combination or permutation which is technically possible:

(xxxvi) Wherein the step (i) further comprises:
  i) determining an additional sub-set of storage resources needed to meet the at least one requirement of the at least one VPA, based on the at least one proposed storage management strategy and based on the historical performance data; and
  ii) outputting a report of the additional sub-set of storage resources needed,
    wherein the report of the additional sub-set of storage resources needed is capable of being utilized by the at c strategy.
(xxxvii) Wherein the method further comprising outputting a report, the report indicative of the time-dependent performance parameters of the VPA indicative of the modified historical performance data, the report indicative of the at least one requirement of the at least one VPA.
(xxxviii) Wherein the method further comprising, further comprising:
  calculating time-dependent performance parameters of the VPA associated with the data historical performance data,
  wherein the outputting of the report comprises outputting to a display the time-dependent performance parameters of the VPA associated with the historical performance data, the time-dependent performance parameters of the VPA indicative of the modified historical performance data and the at least one requirement of the at least one VPA, the display enabling parameter comparisons.
(xxxix) Wherein at least one of the receiving of: at least one proposed storage management strategy; and the receiving of the at least one requirement of the at least one VPA, are performed utilizing a user interface.
(xl) Wherein at least one of the receiving of the at least one of the at least one proposed storage management strategy and the receiving of the at least one requirement of the at least one VPA is from an external system utilizing an automated interface.
(xli) Wherein the report indicating verification of the validity of the at least one proposed storage management strategy is output to an external system.
(xlii) in response to the time-dependent performance parameters of the VPA indicative of the modified historical performance data not meeting the at least one requirement of the at least one VPA, generating a report indicating non-validity of the at least one proposed storage management strategy,
    wherein the at least one verified storage management strategy is capable of being utilized by the at least one data storage management layer to perform an action to implement the at least one verified storage management strategy in the data storage management system in a dynamic manner,
  wherein the report indicating non-validity of the at least one proposed storage management strategy is capable of being utilized by the at least one data storage management layer to perform an action to update the at least one proposed storage management strategy.

According to a sixth aspect of the presently disclosed subject matter there is provided a data storage management layer, comprising:

at least one computing device, operatively connected over a communication network to a plurality of storage resources, the plurality of storage resources comprising at least one data storage unit and at least one control unit, the at least one data storage management layer comprised in, or otherwise operatively connected to, the plurality of storage resources, the data storage management layer and the plurality of storage resources constituting a data storage system, the at least one data storage management layer and the at least one control unit operatively connected over the communication network to at least one host computer device, wherein a sub-set of the plurality of storage resources are assigned to the at least one host, in order to provide storage services thereto according to performance requirements predefined for the at least one host, thereby generating at least one Virtual Private Array (VPA) associated with the at least one host, the sub-set comprising the at least one control unit and the at least one data storage unit, the at least one computing device comprising a processing circuitry, the processing circuitry configured to:
(a) implement at least one storage management strategy, comprising at least one rule, the at least one rule comprising at least one condition and at least one action, the at least one action capable of improving the VPA performance in a dynamic manner; and
(b) repetitively performing the following:
 i) monitor the VPA performance for detection of compliance of the VPA with the at least one condition; and
 ii) responsive to detection of compliance of the VPA with the at least one condition, performing the at least one action capable of improving the VPA performance.

In some examples of the fifth aspect of the presently disclosed subject matter, there is provided a data storage system, comprising:
the at least one VPA, comprising the at least one control unit and the at least one data storage unit; and
the data storage management layer listed above.

This aspect of the disclosed subject matter can optionally include one or more of features (i) to (xlii) listed above, mutatis mutandis, in any desired combination or permutation which is technically possible.

According to a seventh aspect of the presently disclosed subject matter there is provided a non-transitory computer readable storage medium tangibly embodying a program of instructions that, when executed by a computer device comprising a processing circuitry, cause the computer to perform a method of managing a data storage system, the computer device constituting at least one data storage management layer, the data storage system comprising a plurality of storage resources and the at least one data storage management layer operatively connected over a communication network, the plurality of storage resources comprising at least one data storage unit and at least one control unit, the at least one data storage management layer comprised in, or otherwise operatively connected to, the plurality of storage resources, the at least one data storage management layer and the at least one control unit operatively connected over the communication network to at least one host computer device, wherein a sub-set of the plurality of storage resources are assigned to the at least one host, in order to provide storage services thereto according to performance requirements predefined for the at least one host, thereby generating at least one Virtual Private Array (VPA) associated with the at least one host, the method comprising:
(a) implementing at least one storage management strategy, comprising at least one rule, the at least one rule comprising at least one condition and at least one action, the at least one action capable of improving the VPA performance in a dynamic manner;
(b) repetitively performing the following:
 i) monitoring the VPA performance for detection of compliance of the VPA with the at least one condition; and
 ii) responsive to detection of compliance of the VPA with the at least one condition, performing the at least one action capable of improving the VPA performance.

This aspect of the disclosed subject matter can optionally include one or more of features (i) to (xlii) listed above, mutatis mutandis, in any desired combination or permutation which is technically possible.

According to an eighth aspect of the presently disclosed subject matter there is provided a non-transitory computer readable storage medium tangibly embodying a program of instructions that, when executed by a computer device comprising a processing circuitry, cause the computer to perform any of the above methods of managing a data storage system, the computer device constituting at least one data storage management layer, the data storage system comprising a plurality of storage resources and the at least one data storage management layer operatively connected over a communication network, the plurality of storage resources comprising at least one data storage unit and at least one control unit, the at least one data storage management layer comprised in, or otherwise operatively connected to, the plurality of storage resources, the at least one data storage management layer and the at least one control unit operatively connected over the communication network to at least one host computer device, wherein a sub-set of the plurality of storage resources are assigned to the at least one host, in order to provide storage services thereto according to performance requirements predefined for the at least one host, thereby generating at least one Virtual Private Array (VPA) associated with the at least one host.

According to a ninth aspect of the presently disclosed subject matter there is provided a data storage management layer, comprising:
at least one computing device, operatively connected over a communication network to a plurality of storage resources, the plurality of storage resources comprising at least one data storage unit and at least one control unit, the at least one data storage management layer comprised in, or otherwise operatively connected to, the plurality of storage resources, the data storage management layer and the plurality of storage resources constituting a data storage system, the at least one data storage management layer and the at least one control unit operatively connected over the communication network to at least one host computer device, wherein a sub-set of the plurality of storage resources are assigned to the at least one host, in order to provide storage services thereto according to performance requirements predefined for the at least one host, thereby generating at least one Virtual Private Array (VPA) associated with the at least one host, the sub-set comprising the at least one control unit and the at least one data storage unit, the at least one computing device comprising a processing circuitry, the processing circuitry configured to perform any of the above methods of managing a data storage system.

The data storage management layers, and the non-transitory computer readable storage media disclosed herein according to various aspects, can optionally further comprise one or more of features (i) to (xlii) listed above, mutatis mutandis, in any technically possible combination or permutation.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
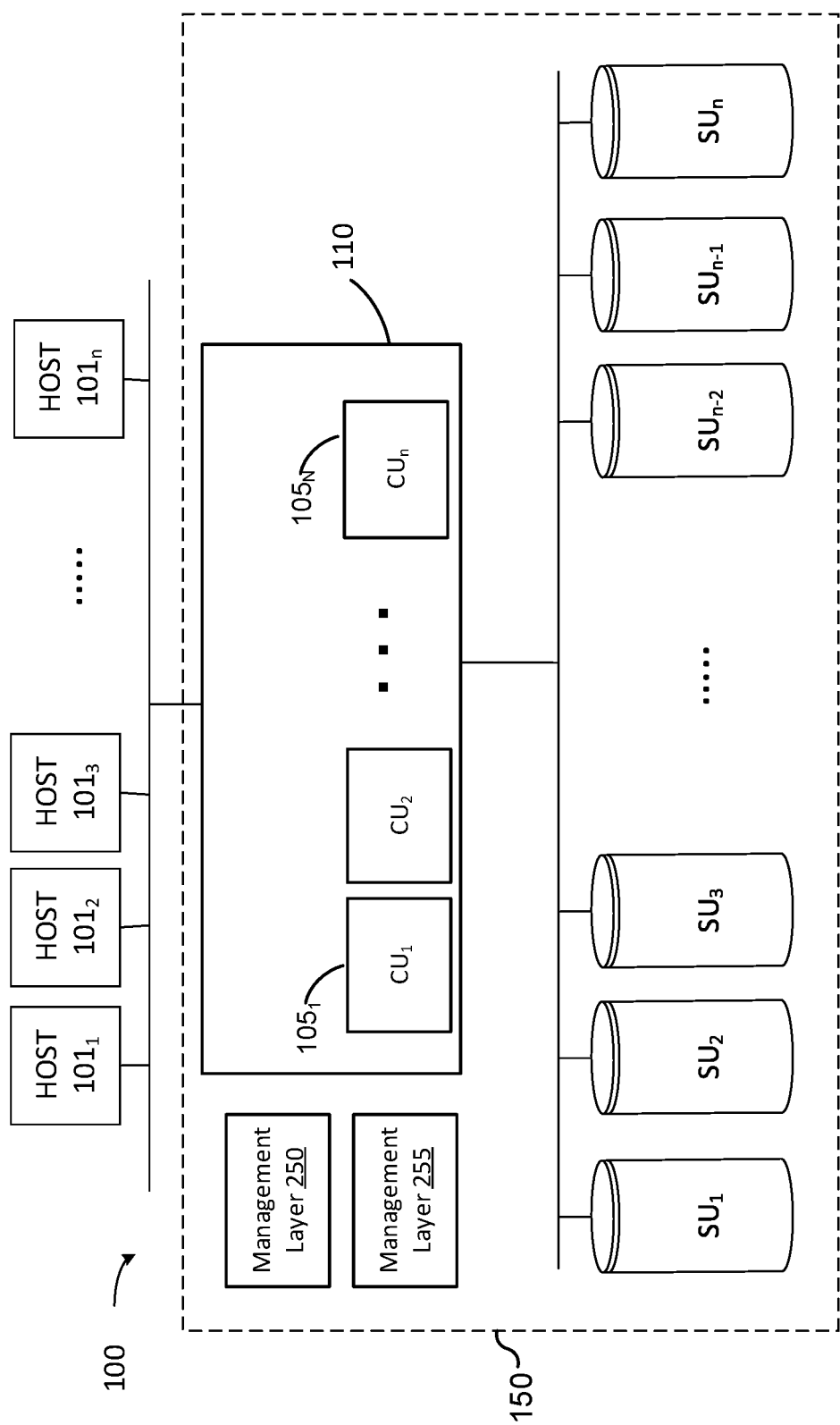
FIG. 1 is a schematic block-diagram illustration of a computer storage system according to some examples of the presently disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

It will be appreciated that for simplicity and clarity of illustration, elements shown in the figures have not necessarily been drawn to scale. For example, the dimensions of some of the elements may be exaggerated relative to other elements, for clarity. Further, where considered appropriate, reference numerals may be repeated among the figures to indicate corresponding or analogous elements.

Unless specifically stated otherwise, as apparent from the following discussions, it is appreciated that throughout the specification discussions utilizing terms such as "managing", "assigning", "generating", "reading", "writing", "providing", "calculating", "comparing", "analyzing", "running", "simulating" "determining", "outputting", "updating", "modifying", "monitoring", "performing", "acting", "setting", "connecting", "utilizing" or the like, include actions and/or processes of a computer that manipulate and/or transform data into other data, said data represented as physical quantities, e.g. such as electronic quantities, and/or said data representing the physical objects.

The terms "computer", "computer device", "control unit", "server" or the like as disclosed herein should be expansively construed to include any kind of hardware device that comprises an electronic processing circuitry, which includes a computer processor (e.g., a Central Processing Unit (CPU), a microprocessor, an electronic circuit, an Integrated Circuit (IC), firmware written for or ported to a specific processor such as digital signal processor (DSP), a microcontroller, a field programmable gate array (FPGA), an application specific integrated circuit (ASIC), etc.) configured for executing computer instructions readable for example from a computer memory, which can also be part of the circuitry or operatively connected thereto.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a non-transitory computer-readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter, fewer, more and/or different stages than those shown in the flowchart figures may be executed. In embodiments of the presently disclosed subject matter, one or more stages illustrated in the figures may be executed in a different order and/or one or more groups of stages may be executed simultaneously. For example, the operation described with reference to block 725 in FIG. 7 can be executed after or together with operations described with reference to block 730. For example, the operation described with reference to blocks 730c, 933 and 935 in FIG. 9 can be executed in a different order from that shown, or in some examples simultaneously. Similarly, some of the operations or steps can be integrated into a consolidated operation or can be broken down to several operations, and/or other operations may be added.

Figure 4:
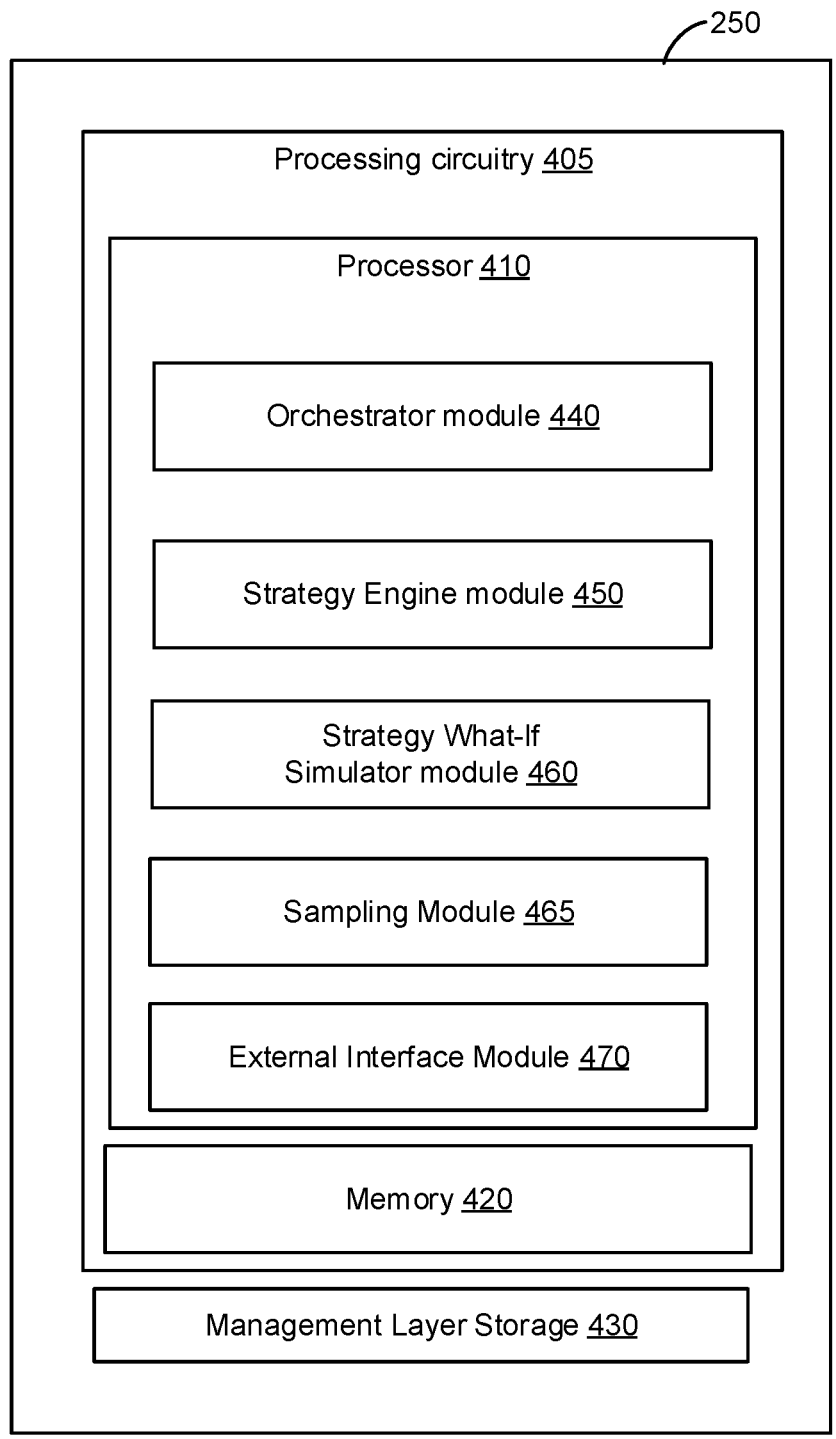
FIG. 4 is a schematic block-diagram illustration of a data storage management layer according to some examples of the presently disclosed subject matter.

FIGS. 1 to 2 and 4 illustrate various aspects of the system architecture in accordance with some examples of the presently disclosed subject matter. Elements in FIGS. 1 to 2 and 4 can be made up of a combination of software and hardware and/or firmware that performs the functions as defined and explained herein. Elements in FIGS. 1 to 2 and 4 may be centralized in one location or dispersed over more than one location. In other examples of the presently disclosed subject matter, the system may comprise fewer, more, and/or different elements than those shown in FIGS. 1 to 2 and 4. For example, in FIG. 4 some components of data storage management layer 250 can be implemented in separate systems, e.g. in a distributed manner.

Bearing the above in mind, attention is drawn to FIG. 1, which is a schematic block-diagram of a computer storage system, according to some examples of the presently disclosed subject matter. Data Center 100 includes a physical storage space comprising one or more physical storage units ($SU_{1-n}$) also known as enclosures, each physical storage unit comprising one or more storage devices. Storage devices (referred to herein below also as "disks") may be any one of Hard Storage devices (HDD) or Solid State Drives (SSD, comprising for example, a plurality of NAND elements), DRAM, non-volatile RAM, or any other computer storage device or combination thereof. Physical storage units ($SU_{1-n}$) can be consolidated in a single unit, or can be otherwise distributed over one or more computer nodes connected by a computer network.

Data center 100 can further comprise an interface layer 110 comprising various control units (CU $105_{1-n}$) operatively connected to the physical storage space and to one or more hosts ($101_{1-n}$), and configured to control and execute various operations in the storage system. For example, control units $105_{1-n}$ can be adapted to read data and/or metadata from the storage ($SU_{1-n}$), and/or write data and/or metadata to the storage ($SU_{1-n}$), execute processes related to deduplication, snapshots, etc. Various other examples of operations performed by the control units are described in more detail below. Control units $105_{1-n}$ can be adapted to execute operations responsive to Input/Output and/or commands received from hosts $101_{1-n}$. A host includes any computer device which communicates with interface layer 110 and receives services therefrom, e.g. a computer server, PC computer, working station, Smartphone, cloud host (where at least part of the processing is executed by remote computing services accessible via the cloud), or the like.

According to some examples, the presently disclosed subject matter contemplates a distributed storage system with an interface layer 110 configured with multiple interconnected control units $105_{1-n}$. As would be apparent to any person skilled in the art, unless stated otherwise, principles described herein with respect to a single control unit can be likewise applied to two or more control units in system 100.

According to some examples, different control units $105_{1-n}$ in the interface layer 110 (where a control unit is implemented, in some examples, by a dedicated computer device, e.g., a dedicated computer server device) can be assigned for managing and executing operations related to a certain area within the physical storage space (e.g. an area comprising, for example, one or more designated physical storage units or parts thereof). In some examples, there are at least two control units that are each assigned to control operations (e.g. handle I/O requests) at respective non-overlapping storage areas, such that one control unit cannot access the storage area assigned to the other control unit, and vice versa.

By way of example, control units can hold translation tables or implement translation functions which map logical addresses to the respective physical storage space in order to assign a read or write command to the one or more control units responsible for it. In response to receiving an I/O request, the control unit that received the request can be configured to determine with which address (defined for example by a logical unit and logical block address—LU, LBA) the I/O request is associated. The control unit can use the address mapping tables (or mapping functions) to determine, based on the logical address referenced in the I/O request, to which storage location in the physical storage to address the I/O request, and which control unit is responsible for processing this request.

In some examples (e.g. for the purpose of redundancy and/or efficiency) two or more control units can be assigned to handle I/O requests addressing the same physical storage area. According to this approach, communication between different components in data center 100 can be realized over a network (e.g. Ethernet, as one non-limiting example, where different control units communicate for the purpose of synchronizing execution of operations e.g. in order to increase efficiency and reduce processing time. In some examples, two control units are each assigned to control operations at non-overlapping storage areas and also at a different overlapping storage area.

In the following description, storage units and control units are sometimes collectively referred to as "storage resources".

In some examples, one or more management layers 250, 255 may be part of the data storage system, along with the storage resources. The management layer(s) may at least control allocation of storage resources to hosts. Examples of this functionality are disclosed further herein with regard to FIGS. 2A, 2B, 3.

Communication between hosts ($101_{1-n}$) and interface layer 110, between interface layer 110 and storage units ($SU_{1-n}$) and within interface layer 110 (e.g., between different control unit $105_{1-n}$) can be realized by any suitable infrastructure and protocol. Example interfaces are disclosed further herein with regard to FIG. 2A. Hosts ($101_{1-n}$) can be connected to the interface layer 110 directly or through a network (e.g. over the Internet). The components within the dashed line 150, including the interface layer 110 and storage units ($SU_{1-n}$), and in some cases the connectivity between them, may in some examples be referred to as a data storage system. Within the data center 100, the data storage system 150 provides storage services to the Hosts ($101_{1-n}$).

Figure 2A:
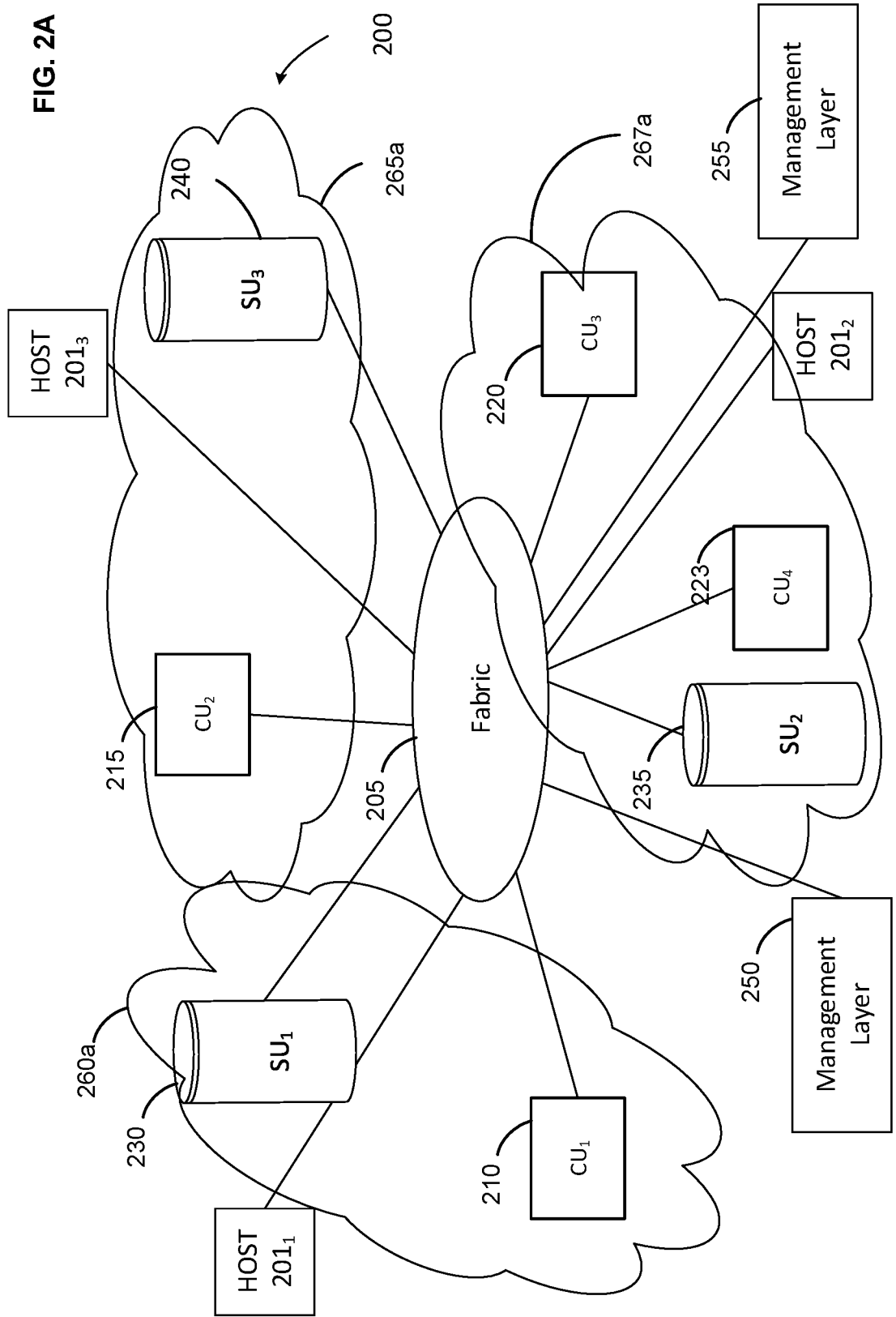
FIGS. 2A and 2B are schematic block-diagram illustrations of a computer storage system comprising a fabric according to some examples of the presently disclosed subject matter.
Figure 2B:
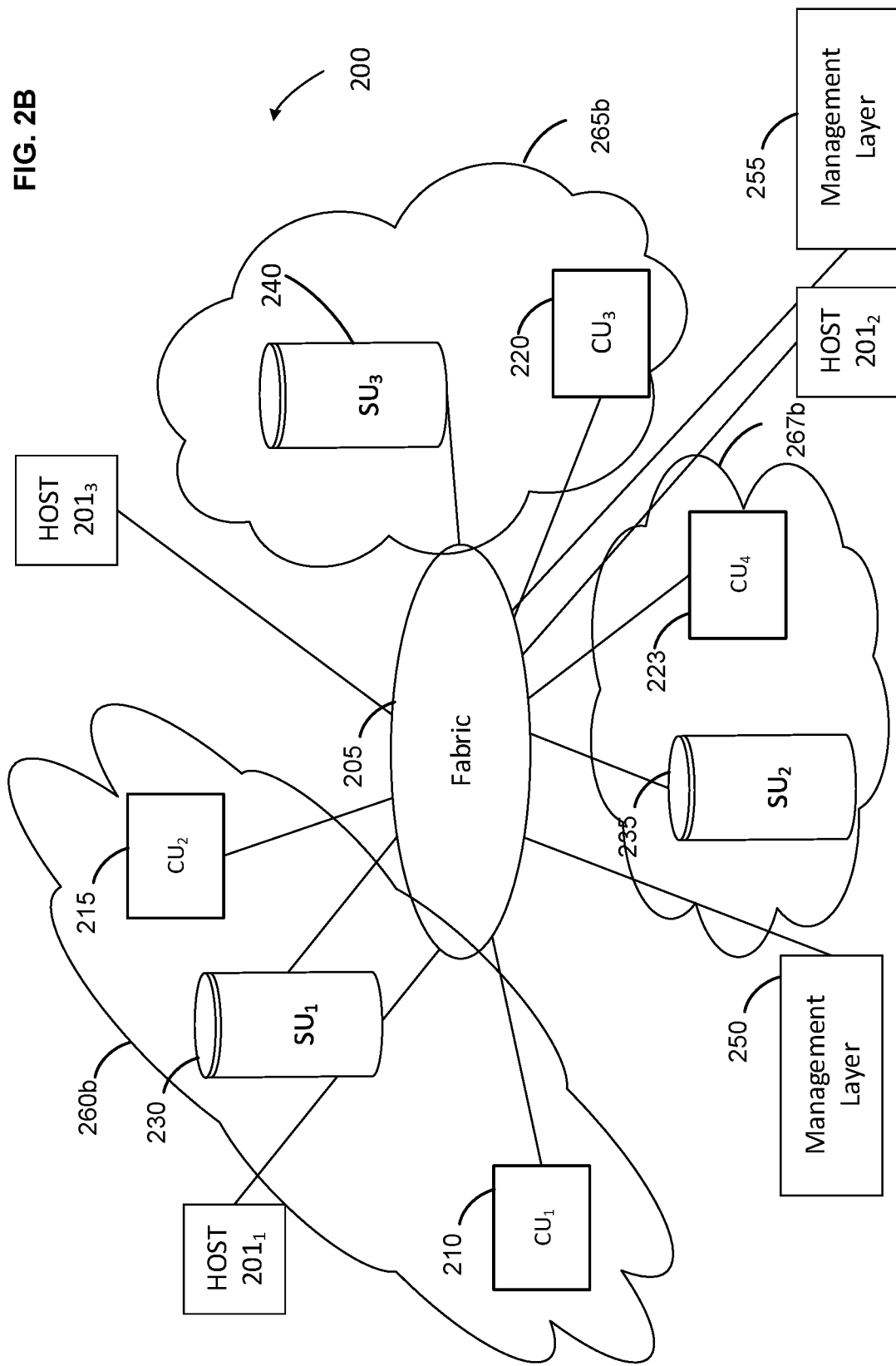

Attention is drawn to FIGS. 2A and 2B, which are generalized schematic block-diagrams of a computer storage system, according to some examples of the presently disclosed subject matter. It is noted that FIGS. 2A and 2B are provided for illustrative purposes only, and should not be construed as limiting.

FIGS. 2A and 2B illustrate, in a generalized fashion, implementation of components of FIG. 1 over a shared fabric or communication network. Turning first to FIG. 2A, Host computer devices $201_{1-3}$, Control units $CU_{1-4}$ (numbered 210, 215, 220 and 223) and storage units $SU_{1-3}$ (numbered 230, 235, and 240) are shown. Also shown are Management Layer 250, 255. It should be noted that the figures show the management layer and the CUs as separate entities, in some cases as separate physical servers. According to some examples, the managements layer functionality, or some of its functions, may reside physically on one or more CUs, rather than on separate hardware.

These components can be operatively connected across the communication network 205 Communication network 205 may be referred to in some examples as fabric 205. According to one non-limiting example, the communication fabric between various elements of data center 100 is implemented using NVMeoF. These components, along with network 205, may be referred to as data center 200.

In some non-limiting examples, hosts and control units may be connected over fiber channel, Ethernet, and Infiniband networks, using for example NVMeF, SCSI or proprietary protocols. In some non-limiting examples, control units communicate with each other on Ethernet or Infiniband networks, using NVMeF, SCSI or proprietary protocols. In some non-limiting examples, Control units and Storage units may be connected over fiber channel, Ethernet, and Infiniband networks, using for example NVMeF, SCSI or proprietary protocols. In some examples, management layer can use TCP/IP networks. In some examples, bandwidth required for communications with management layer may be lower than for communication between the other components.

The data center 200 can in some examples reside in one location. In other examples, the data center can be distributed over several locations. In some examples, the data center 200 represents components managed by a single Managed Service Provider of storage services, e.g. a private cloud.

In the non-limiting example of FIG. 2A, the components $SU_1$ and $CU_1$ can be configured to provide storage services to Host $201_1$, according to pre-defined performance requirements of the Host. Such requirements may include, for example, the latency allowed in read/write operations performed by a host, the number of I/O operations per second (IOPS) that may be achieved, and the throughput required in terms of bits or bytes per second. $SU_1$, and $CU_1$ may be referred to, in some examples, as the private data storage system associated with Host $201_1$. According to some examples, this private data storage system may be referred to also as a Virtual Private Array (VPA). A VPA can be composed of an array of storage resources (control units and storage units), associated with, and providing services to, a host such as Host $201_1$ or Host $201_2$, or in some examples to a number of hosts functioning together. The allocation of the $SU_1$ and the $CU_1$ to Host $201_1$ is represented in the figure by the cloud shape 260a representing a respective VPA. The VPA may be referred to as "private", at least in the sense that the resources in the VPA can provide services to specific defined hosts. It may be referred to as "virtual", at least in the sense that the storage resources of which it is composed may be changed, in some cases the change being transparent to the host, and that the units may not be physically co-located, but rather distributed and located at different locations and connected via the communication network 205. A VPA may in some examples also be referred to herein as the sub-set of the plurality of resources of the data storage system that are associated with a particular host or hosts. In some examples, a VPA is assigned a plurality of control units and a plurality of storage units. In some examples, a VPA is assigned one control unit and one storage unit.

Similarly, $SU_3$ and $CU_2$ can be configured to provide storage services to Host $201_3$, and their VPA is represented in the figure by the shape 265a. Similarly, $SU_2$, $CU_3$ and $CU_4$ can be configured to provide storage services to Host $201_2$, and their VPA is represented in the figure by the shape 267a. The allocation of $SU_1$, and $CU_1$ to Host $201_1$, the allocation of $SU_3$, and $CU_2$ to Host $201_3$, and the allocation of $SU_2$, $CU_3$ and $CU_4$ to Host $201_2$ can be performed in some examples by Management Layer 250, 255.

The above example discloses each CU and SU being allocated to one VPA. However, in some examples, an individual CU and/or a SU may be allocated to multiple VPAs, and shared by these VPAs, where each VPA receives a part of the capacity of the CU or SU. This may be done, for example, in the case of large-capacity units, where each unit has more capacity than would be typically needed by some VPAs. One example is implementation of CUs as Virtual Machines (VM). Thus, the disclosure further herein of strategies for re-assignment of storage resources among VPAs, and improving performance of the VPAs, applies not only to re-assignment or performance improvement of the VPA as whole, and/or of entire CUs and SUs, but also in some examples to re-assignment or performance improvement of portions of the capacity of a unit.

Turning now to FIG. 2B, it depicts a change in the storage topology of data center 200. VPA 260a is now represented as 260b, indicating that the VPA associated with host $201_1$ has been expanded to include a second control unit, $CU_2$. Reference 265b indicates that the VPA 265a associated with host $201_3$ has also been modified, so that it now includes $CU_3$ in place of $CU_2$. Similarly, reference 267b indicates that the VPA 267a associated with host $201_2$ has also been modified, so that it no longer includes $CU_3$. Possible reasons for such a change in topology are exemplified with regard to FIGS. 3 and 5, further herein. In some examples, Management Layer 250, 255 can be responsible for re-allocating the storage resources and thus changing the topology. The change in the topology can in some examples be accomplished by configuration changes and/or communication of instructions, in some cases performed remotely from the location of the storage resources, with no re-cabling or other physical reconfiguration actions required.

Other examples of functions of Management Layer 250, 255 are disclosed further herein, with regard to FIGS. 3 to 9. Note also that two management layers are shown, 250 and 255, as a non-limiting example. This could be done, for example, for redundancy and availability.

Note also that one single fabric 205 is shown, as one non-limiting example. However, in some cases, multiple communication networks can be implemented to provide the fabric 205, for example to provide network redundancy and availability. In some cases, the multiple networks can be of different technologies and lower-layer protocols. Similarly, in some examples the hosts and storage resources may be grouped into clusters, each on a communications network served by a communications switch. The switches can be connected to each other, resulting in a network of communication networks, connecting multiple clusters. In some examples management layer 250, 255 may manage all of the clusters of hosts and storage resources connected to the expanded communication network. This may result in a relatively large number of VPAs managed by the management layer, in some examples hundreds or thousands of VPAs. In some examples of an NVMeoF implementation of communication network 205, these multiple communication networks may in aggregate be referred to as communication network 205.

In some examples, the combination of hosts, the storage units and control units and the management layer may be referred to as a data center. In some examples, the data center can be located at one physical site, for example to allow higher-speed communication between components on the network, and thus possibly higher-performance in host access to storage. In some examples, the data center can span various physical sites, and the communication network can in such cases cover longer distances.

Figure 3:
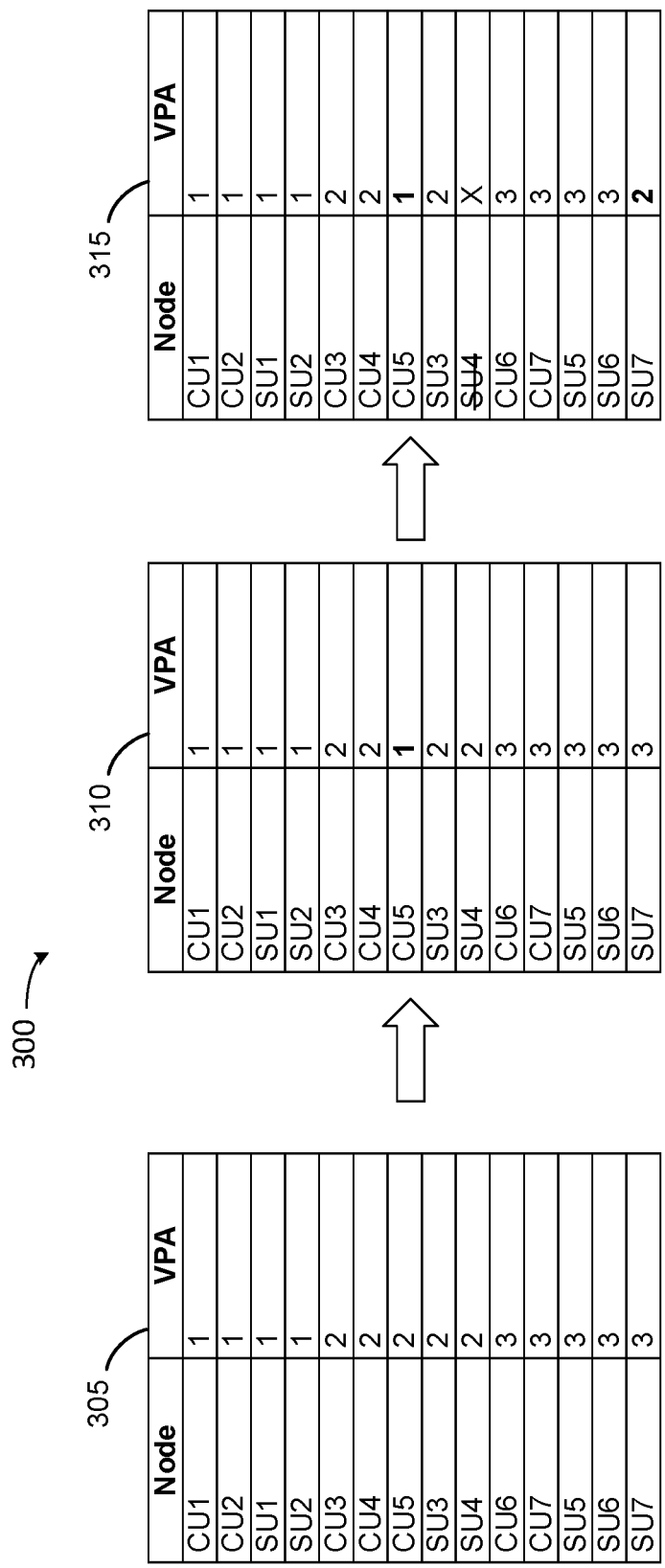
FIG. 3 is a schematic illustration of data storage management operations according to some examples of the presently disclosed subject matter.

Note also that each host is depicted in the figures as a single host, e.g. Host $201_1$, only for purpose of clarity of exposition. Note that in some examples a host that is served by the data storage system may represent a host composed of multiple host computers. The host or hosts can run one or more computer applications. Attention is drawn to FIG. 3, which illustrates some generalized schematic example functions of a computer storage system, according to some examples of the presently disclosed subject matter. It is noted that FIG. 3 is provided for illustrative purposes only, and should not be construed as limiting.

Reference 300 shows a non-limiting example of changing the allocation of storage resources. Table 305 shows an example list of storage resources and their initial allocation to serve hosts. In table 305, the units or nodes CU1, CU2, SU1, SU2 are allocated to Virtual Private Array (VPA) number 1.

Also shown are VPA 2, serving a different host, and including CU3, CU4, CU5, SU3, SU4; as well as VPA 3, serving a third host, and including CU6, CU7, SU5, SU6, SU7. The control units CU1 to CU7 and storage units SU1 to SU7 may be referred to as a plurality of storage resources, where a sub-set of the storage resources is assigned to a certain host e.g. CU1, CU2, SU1, SU2 of the plurality of storage resources is allocated or assigned to VPA 1.

In some examples, the management layer 250 can obtain an initial topology of storage resources, exemplified in Table 305, as follows. The data storage system 150 has a plurality of resources. In some examples, the management layer can determine, based on the defined performance requirements of each host, the sub-set of the plurality of storage resources to assign each host, where each sub-set of resources includes control units and storage units. The management layer can assign the appropriate sub-set of resources to each host or hosts, thereby generating one or more Virtual Private Arrays associated with that host. Examples of host performance requirements are disclosed further herein with regard to FIG. 7. In some examples, a system other than the management layer 250 can perform the initial assignment of resources.

In some examples, the management layer 250 receives one or more pre-defined storage management strategies, from external systems or from operators. In some examples, the strategies are generated internally to the management layer (e.g. by the strategy engine 450, or in some examples by the orchestrator module 440 itself). Each strategy comprises one or more rules for e.g. assigning storage resources to the hosts, in a dynamic manner. Each rule comprises one or more conditions, and actions to be taken by the management layer if the conditions are met. In some examples, the strategies aim to ensure compliance of each VPA to the requirements of its host, for example in the areas of storage service performance and resource utilization. Non-limiting examples of conditions and actions are disclosed further herein. The performance of actions to ensure compliance of each VPA to the requirements of its host, by improving VPA performance, is also referred to herein interchangeably as orchestration of the resources, and in some examples as VPA topology management or resource topology management. In some examples, the management layer 250 implements these strategies.

In some examples, the management layer monitors VPA performance for detection of compliance of the sub-set of storage resources in the VPA with each condition. If this happens, the management layer will attempt to perform the actions associated with the relevant condition. In some examples, the actions are capable of improving performance of VPAs, for example to improve at least one of storage service performance and resource utilization. In some examples, the actions are capable of improving performance (e.g. storage service performance and/or resource utilization) of individual storage resources (CUs and/or SUs.) According to some examples, the management layer is configured to, and capable of, performing resource re-assignment actions, to dynamically re-assign resources such that the requirements of each host are maintained over time and adapted to the changing situation in each VPA of storage of access traffic.

The communication network can enable such dynamic and flexible re-assignment of resources that are not necessarily physically co-located, for example by sending commands from the management layer over the network, to software located in the control units. The commands can instruct the control unit SW to change a VPA's configuration, by adding and/or deleting control and storage units from the VPA. The configuration can in some examples occur automatically, e.g. by parameter changes in the units and/or in network components such as routers, without human operator involvement in issuing commands or in changing physical cabling. The above process is exemplified with regard to FIGS. 5-6, disclosed further herein. In some examples, the resources re-assignment action can include generating updated topology information characterizing the VPA(s), where the updated information accounts for the changes in resource assignments resulting from the re-assignment action. Tables 310 and 315 describe example actions performed as a result of implementing strategies, monitoring the storage resources for compliance with conditions, and then autonomously performing actions to reallocate storage resources in a dynamic manner.

Some non-limiting examples of storage management strategies to be implemented by the management layer 250 can be based on one or more, or any combination of:
 a) monitoring for certain time-based conditions (e.g. particular time and date—see for example the case of table 310, further herein),
 b) monitoring for certain events in system 200 (e.g. an event of component failure—see for example the case of table 315, further herein, and discussion below)
 c) monitoring the resources of a particular VPA for storage service performance related conditions—related to parameters that include, according to some non-limiting examples:
  i. read/write latency (for example performed by a particular control unit, or overall read/write latency for a VPA)
  ii. number of I/O operations per second (IOPS) performed by control units
  iii. throughput of storage access operations, e.g. measure in bits or bytes per second (in some examples, this may be referred to also as bandwidth)
 d) monitoring the resources of a particular VPA for conditions related to resource utilization, related to parameters that include, according to some non-limiting examples:
  iv. physical capacity of e.g. a storage unit;
  v. logical capacity of e.g. a storage unit—before data reduction (compression+deduplication) (in some cases the data reduction ratio may be 5:1);
  vi. data reduction ratio (where data reduction includes compression and/or deduplication)—e.g. 5:1;
  vii. utilization of memory or other storage resources in a storage unit or a control unit within the sub-set;
  viii. utilization of CPU (central processing unit) resources in a control unit or in a storage unit within the sub-set;
  ix. utilization of a network or fabric that is connecting VPA storage resources;

x. network communication statistics that include, according to some non-limiting examples:
1. packet loss
2. retransmission
3. latency
4. packet size
5. bandwidth
6. errors and error rates;
e) monitor network and host parameters that include, according to some non-limiting examples:
xi. Used protocols
xii. Applications running on the host
xiii. Network Topology
xiv. Packet QoS (Quality of service)

In some cases, the parameter monitored may be an absolute value, while in other cases it may be a percentage. In some cases, resource utilization parameters may be amount used, while in others they may be the amount free. In some examples, conditions related to performance of storage services, and/or related to resource utilization, can include thresholds, e.g. "when latency goes above 1 milliseconds" "IOPS went below 400K per second", "when used physical capacity of a storage unit is over 210 Terabyte", "when free physical capacity of a storage unit is less than 15%", "when data reduction ratio has gone below 2:1" or "when utilization of CPU goes above 95%". In some examples, storage service performance and resource utilization may both be referred to generally as VPA performance or VPA behavior. In some examples, the conditions to be monitored by means of storage management strategies, may be the performance (e.g. storage service performance and/or resource utilization) of individual storage resources, rather than (or in addition to) performance of whole VPAs.

Note that in some examples the terms "read-write latency" and "latency" are used herein interchangeably.

In one example, a decrease in data reduction ratio for the VPA may drive the need to assign additional resources to the VPA, or to replace the resources assigned to the VPA with resources that have stronger data reduction schemes.

In some examples, the monitoring data reaches management layer 250 through the use of agents that are installed in hosts, communication network components, control units and/or storage units. In some examples, the data is transferred from these components to the management layer in pull mode and/or in push mode. For example, the host agent may acquire and transfer data such as:
1. Application type e.g. SQL DB, No SQL DB, VDI etc.
2. Performance—Latency, throughput, IOPs
3. CPU utilization
4. Memory utilization
5. Network utilization In some examples, it may be more important to monitor read-write latency than other performance parameters. In these examples, more general system metrics such as CPU, memory and network load may be more likely to result in false positive and false negative events. For example, using a polling thread can consume CPU cycles, regardless of the storage workload. Another example is a static memory allocation, which is fixed and is not related to the actual storage workload. A third example is IOPS, where a control unit under heavy load may build up latency in read-write operations, and may not handle all of the IOPS demand of the host. In such a case, the IOPS metric may not increase, as the additional I/Os did not occur in the unit, while latency would be measured as increasing. In such examples, monitoring the storage specific read-write latency metric is preferable, as both the strategies generated, and the orchestration of resources based on it, can be more accurate. However, in some cases it may be beneficial to monitor other metrics such as CPU, memory, IOPS etc., in addition to IO latency, to even further increase the accuracy of the strategy generation and orchestration of topology.

Note that in some examples, the component and network parameters and data disclosed above are also input as historical data into strategy engine module 450 and/or into what-if simulator module 460, disclosed further herein.

In some examples, a strategy can indicate to implement the action immediately, e.g. to move a resource from one VPA to another VPA immediately, without waiting for a pre-defined time (e.g. 9 AM next Friday) or monitoring for meeting of storage service performance-based or utilization conditions. This may occur, for example, if an operator notices a problem and decides that a particular action must be performed immediately. In such a case, the "condition" may be simply "perform this now".

Turning to non-limiting specific examples of the above, in FIG. 3, VPA 1 may be associated, for example, with a host that resides in New York City, supporting a ticket-sales application for local New York events. VPA 2 may be associated, for example, with a the host of a San Francisco business that is active only during local work hours. In the example, tickets for an Event A will be on sale next Friday from 9-11 AM New York time, and large IOPS capacity will be needed for accessing the storage units of VPA 1 during online ticket sales. At that same time, the San Francisco business may be closed, with very little data storage access activity expected. The management layer 250 can be configured with a first data storage strategy that includes the following two rules: (a) next Friday, 10 minutes before 9 AM NY time (i.e. a first condition), perform a first action: re-assign CU5 from VPA 2 to VPA 1, thus providing additional capacity for the ticket sales, while leaving VPA 2 with sufficient CU capacity (two CUs remaining); (b) next Friday, 10 minutes after 11 AM NY time (i.e. a second condition), perform a second action: re-assign CU5 from VPA 1 back to VPA 2, thus restoring the previous resources allocation state. These conditions may be examples of time-based conditions, and thus the first data storage strategy may in some examples be referred to as a time-based storage management strategy.

Table 310 shows the assignment of the storage resources to the VPAs as of 9 AM NY time Friday, after performance of the first action. It can be noted that CU5 is assigned to VPA 2 (note the bold number). It can be further noted that the topology of the data storage system is changed in table 310, as compared to that in table 305. The resources re-assignment action exemplified by table 310 is one that involves increasing the sub-set of the plurality of storage resources of VPA 1 assigned to the New York host, and increasing the sub-set of the plurality of storage resources of VPA 2 assigned to the San Francisco host.

A different example case that may be illustrated by tables 305 and 310 may be heavy product sales on "Black Friday" for a customer who uses VPA 1. In such a case, VPA 1 may need additional resources for certain hours on that particular day.

A further example case that may be illustrated by tables 305 and 310 may be VPAs of various financial service applications over the world. VPA 1 may be associated with a financial service customer who is involved with trades on a stock exchange in New York, while VPA 2 may be associated with a financial service customer who is involved with trades on a stock exchange in Tokyo. A strategy may be that every business day that the stock market is open, a certain number of minutes before trading begins in New York, e.g. at 9 AM, CU5 can be re-assigned from VPA 2 to VPA 1, thus providing additional capacity for the heavy trading volume in New York, while Tokyo may be in a low-traffic time period. As another example, a single customer may have a private cloud of storage, with separate VPAs at their New York and Tokyo locations. Another example may be a food services company with locations worldwide, that specializes in lunch orders. The strategy can be of a "follow the sun" nature, where the extra resource capacity is moved from location to location based on time zone and peak lunch hours. Still another example may be paycheck generation in human resource departments of employers, or generation of bills by e.g. electric and telephone companies, which, in some cases, need peak resources on particular days of each month. The preceding are all examples of strategies that call for performance of an action at a pre-defined time.

In this example, it may be that at 10 AM NY time, storage unit SU4 fails. These are indicated in table 315, by SU4 being crossed out and its VPA allocation being "X". The management layer 250 can be configured with a second data storage strategy that includes the following rule: if a storage unit of VPA 2 fails (a third condition), perform a third action: re-assign an SU from a VPA that has a spare resource according to its service performance and/or utilization requirements. In the example shown, VPA 3 has such a spare resource, and is chosen for the re-assignment action.

The rationale behind the second strategy is that VPA 3 will still have sufficient SU capacity (two SUs remaining). The implementation of this third action is indicated in table 315, by SU7 now being assigned to VPA 2. This third condition may be an example of a condition that is based on performance of the sub-set of storage, since it is associated with failure of a unit.

The implementation of the second action related to CU5, that of restoring CU5 to VPA 2 at 11 AM, is not shown in the figure. The resources re-assignment action exemplified by this second action is one that involves decreasing the sub-set of storage resources of VPA 1 assigned to the New York host.

Note that in some examples, monitoring for component failure is not merely waiting for a report or alarm or other indication of an actual failure of a component such as, for example, a control unit or a storage unit. In some examples, failure prediction heuristics and/or machine learning of behavior and characteristics of the entire unit, or of unit components such as batteries, Solid State Drives (SSDs), Power Supply Units (PSU) etc. may be performed. As one non-limiting example, it is learned by machine learning, and/or by heuristics, that when a particular model of storage unit reaches a particular temperature, it is has a certain high probability of failing within three weeks. When an agent in a particular storage unit then indicates to the management layer 250 that the storage unit has reached this temperature, the example strategy is not to wait for actual failure of the unit, but to automatically replace the potentially-faulty unit with a unit that resides in the free pool, well ahead of the actual predicted failure. Such a proactive behavior based on autonomous prediction can in some examples maintain the system SLA and avoid the risk of the VPA containing a single point of failure in the (in case of another failure in the same VPA).

Note also, that in the example of FIG. 3, the actions involved re-assigning units (CUs or SUs) from one VPA to another. In some other example cases (not shown in FIG. 3), the plurality of storage resources in the data storage system can include resources that are not, at that point, assigned to any VPA of a host. These unassigned resources can be allocated to a free pool or pools of spare resources. In some examples, there may be a centralized free pool shared by the data storage system. In some examples, storage management strategies can include storage re-assignment actions that assign one or more storage resources (CUs or SUs) of the plurality of storage resources from a pool of spares to a VPA. In some examples, storage management strategies can include storage re-assignment actions that assign one or more storage resources (CUs or SUs) of the plurality of storage resources from a VPA to a pool of spares.

According to some examples, the re-assignment action in a strategy may allow the orchestrator module to choose a source VPA rather than specifying a VPA. For example, rather than instructing "re-assign to VPA 1 a CU from VPA 2", a strategy may instead instruct a more flexible action such as "re-assign to VPA 1 a CU from the VPA with a 'bronze' classification that has the most free capacity". (The concept of 'bronze' classification is disclosed further herein with regard to FIG. 7.)

Note also that in the example of FIG. 3, the mapping in the table is between storage resources and VPAs. In other examples, the mapping in the table can be between storage resources and the hosts that they serve.

Note also that the actions described in the example of FIG. 3 may be referred to in some examples as resource re-assignment actions. According to some examples, other actions associated with strategy rules, that are capable of improving performance of data resources of the data storage system, e.g. improving at least one of resource service performance and resource utilization, can be possible, instead of, or in addition to, resource re-assignment actions. One non-limiting example is the sending of alerts or messages to external systems, e.g. to a Network Operations Center (NOC) or other control center of the data storage system provider, of the customer associated with the relevant host computer devices, to both, or possibly to some other system.

Another non-limiting example action is that storage management layer 250 (e.g. using orchestrator module 440) can perform an action to re-configure the at least one communication network. It can for example send commands to the communications network to re-configure e.g. network switches and routers, so as to resolve or avoid e.g. performance problems.

Still another non-limiting example action, is that storage management layer 250 (e.g. using orchestrator module 440) can send an instruction or other communication to storage resources (e.g. control units), that for a particular VPA the storage resource should apply a particular data reduction scheme, e.g. a particular compression algorithm. This may be done, for example, where the resource is configured to support more than one compression algorithm (whether in hardware and/or in software), and monitoring reveals that the data reduction ratio is below a certain threshold.

Still another non-limiting example action is that storage management layer 250 (e.g. using orchestrator module 440) can send a message or other communication to the relevant host computer device(s). Such a communication can include a recommendation, or a command, that the host application(s) make a change so as to reduce their use of storage, or the number of IOPs that they perform. For example, the host can be instructed to stop running a particular application, e.g. for a specific time period. For example, the host can be provided a recommendation to stop or delay running of non-critical background maintenance tasks, such as backups or cleanup tasks. In such a manner, the host can be able to manage its applicative load on the storage resources, rather than (or in addition to) having the orchestrator module of the management layer 250 add or remove storage resources.

Still another example may be to instruct an air conditioner to turn on, if the strategy indicates that cooling the relevant units can improve their performance. Still another example of an action, is that a storage resource can be re-classified as belonging to a certain VPA, but as available for re-assignment to other VPAs that may have a need for it. This may occur, for example, when the IOPS load on the first VPA is at a comparatively low level, e.g. "TOPS dropped below 400K/second threshold".

In some examples, the orchestrator module, and/or other components of the storage management layer, can include software "hooks" that enable customized logic that can allow programming of such actions, or of other actions of the customer's choice, e.g. "call the NOC at this phone number". In some examples, the hooks can allow programming of a variety actions by the host applications themselves.

As disclosed with regard to FIG. 3, in some examples VPAs can be scaled, in terms of adjusting both performance and storage capacity of a control unit, in a manner that is not disruptive to normal operations of the data storage system 150, by use of the strategies implemented by the management layer. In some examples the assignment and re-assignment of storage resources can be done automatically and autonomously in a dynamic manner by the management layer, e.g. based on monitoring of real-time performance of the VPA, without a human storage operator having to issue commands or monitor the resources. As soon as each condition is detected, the system of the presently disclosed subject matter may, in some examples, take automatic and immediate action.

In some examples, it is required that resolution of storage performance problems occur within a matter of minutes, in real time or near-real time. Examples of this include a stock market crash in another country, which is expected to increase trading volumes in the host's country within a few minutes. The dynamic, and possibly autonomous, re-assignment of storage resources, or for example indication to host applications to change their storage-related behavior, may provide the example advantage of enabling a more efficient and fast re-assignment, one that can occur quickly enough to prevent the VPAs from having periods of resource deficiency. VPA performance can thus be maintained. By comparison, a system that relies on manual re-assignment actions by an operator, may have additional latency in the resource re-assignment process, associated with the human reaction to alerts and with the time to perform manual actions such as entering re-configuration commands. In some examples, operator resolution of the problem, will not occur within minutes. This latency may result in periods of resource deficiency, that may cause at least temporary degradations in service performance of the VPA, and may thus impact the overall performance of the applications on the associated hosts. This is even more likely to happen, for example, in the overnight hours, when few operator staff may be working. If, in the overnight, there is a sudden change in storage access behavior, and/or storage service performance, and/or failures occur, and these changes occur in a relatively large number of VPAs, operator intervention to implement all of the actions required, in a timely enough manner to ensure that performance does not degrade in any of the VPAs, may, for practical purposes, be impossible, and thus not be relevant.

In addition, automation of the actions may in some examples yield more accurate re-assignment actions, when compared to the actions of an operator who may be taking action in a stressful situation, e.g. a component failure or a sudden surge in read-write operations.

Also, in some examples, a more efficient utilization of a given set of storage resources may be possible, as the same resource can be dynamically allocated to different hosts based on the relative need for the resource, as defined by the strategies.

The use of such strategies may in some examples also provide the advantage of more efficient utilization of the resources in data storage systems. Since numerous different customers may exist, located in different places, possibly in different time zones, and with different patterns of peak behavior, statistically the customers may not all need their maximum level of resources at the same time. It may therefore be possible to assign each VPA a basic number of resources, to maintain a centralized free pool, and to dynamically re-allocate resources between VPAs, making use of the pool, based on for example the calendar, scheduled and ad hoc events, and storage service performance and utilization levels, so as to scale each VPA in a flexible manner. This efficient use of a given pool of resources, by means of dynamic reallocation, can in some examples provide the additional advantage of enabling data storage systems to serve a larger number of hosts/customers with the given number of resources. In addition, when considering the individual customer of storage services, resource sharing, as may be possible when using such dynamic re-allocation of resources, enables a reduction in the number of resources allocated to the customer's host computer on a fixed basis, thus in some examples providing a more efficient storage solution to the individual customer.

FIG. 4 is a schematic block-diagram showing some components of a data storage management layer, according to some examples of the presently disclosed subject matter. It is noted that FIG. 4 is provided for illustrative purposes only and should not be construed as limiting; in reality a data storage management layer can include additional elements and/or a different design.

Data storage management layer 250 can be implemented on a computing device comprising a processing circuitry 405 and a memory 420. The processing circuitry 405 is configured to provide processing capability necessary for the management layer to function as further detailed herein with reference to FIGS. 2-3 and 5 thru 9. Processing circuitry 405 comprises or is otherwise operatively connected to one or more computer processors 410. According to some examples, the processor(s) of processing circuitry 450 can be configured to execute one or more functional modules in accordance with computer-readable instructions implemented on a non-transitory computer-readable memory of the processing circuitry. Such functional module(s) are referred to hereinafter as comprised in the processor 410.

Processing circuitry 405 can be configured, e.g. by Orchestrator Module 440 to at least receive storage management strategies and implement them. More details of operations executed by Orchestrator Module 440 according to some examples of the presently disclosed subject matter are described below with reference to FIGS. 5 and 6.

Processing circuitry 405 can be further configured, e.g. by Strategy Engine Module 450 to at least receive data inputs, analyze them, and generate and output storage management strategies. More details of operations executed by Strategy Engine Module 450 according to some examples of the presently disclosed subject matter are described below with reference to FIGS. 7 to 9.

Processing circuitry 405 can be further configured, e.g. by What-If Simulator Module 460, to at least receive storage management strategies, analyze them in light of historical data, validate the strategies, and in some cases evaluate the impact of resource quantities on the validity of the strategies. More details of operations executed by What-If Simulator Module 460 according to some examples of the presently disclosed subject matter are described below with reference to FIGS. 10 to 11.

Processing circuitry 405 can be further configured, e.g. by sampling module 465, to at least sample data of performance of the sub-set of storage resources. In some examples, this module can sample historical performance data, which is indicative of the past performance of a VPA.

Processing circuitry 405 can be further configured e.g. by External Interface Module 470, to at least generate and provide interfaces between data storage management layer 250 and external systems. The interfaces can include, by way of non-limiting example, interfaces to receive performance data and enrichment data for purposes of analysis by Strategy Engine Module 450, interfaces to human operators who in some examples execute manual commands, and interfaces to the fabric 205, to provide operative connectivity so as to be capable of communicating with storage resources and with hosts. At least these interface functions are described further herein. These are non-limiting examples of interfaces.

Memory 420 can be utilized, for example, for storing information needed for mapping between the plurality of storage resources and the respective VPAs as mentioned above. Memory 420 can be utilized, for example, by orchestrator 440 for storing service performance and utilization counters while monitoring, and by strategy engine 450 for storing data of calculations performed during analysis of performance data.

According to further examples, data storage management layer 250 can be operatively connected to management layer storage 430 (including transitory and non-transitory computer data storage). Storage 430 can be utilized, for example, for storing large amounts of data, such as the historical performance data that is analyzed by strategy engine 450.

In other examples, there can be a different division of storage between memory 420 and management layer storage 430. For example, the service performance and utilization counters generated by the orchestrator module, while performing monitoring, can in some cases be stored in management layer storage 430.

FIG. 4 illustrates only a general schematic of the system architecture, describing, by way of non-limiting example, one aspect of the presently disclosed subject matter in an informative manner only, for clarity of explanation only. It will be understood that the teachings of the presently disclosed subject matter are not bound by what is described with reference to FIG. 4.

Each system component and module in FIG. 4 can be made up of any combination of software, hardware and/or firmware, installed and/or executed on a suitable device or devices, that perform the functions as defined and explained herein. Equivalent and/or modified functionality, as described with respect to each system component and module, can be consolidated or divided in another manner. Thus, in some embodiments of the presently disclosed subject matter, the system can include fewer, more, modified and/or different components, modules and functions than those shown in FIG. 4. To provide one non-limiting example of this, in some examples the functions of memory 420 can be combined into storage 430. One or more of these components and modules can be centralized in one location or dispersed and distributed over more than one location.

Each component in FIG. 4 can represent a plurality of the particular component, possibly in a distributed architecture, which are adapted to independently and/or cooperatively operate to process various data and electrical inputs, and for enabling operations related to storage management. In some cases multiple instances of a component can be utilized for reasons of performance, redundancy and/or availability. Similarly, in some cases, multiple instances of a component can be utilized for reasons of functionality or application. For example, different portions of the particular functionality can be placed in different instances of the component.

Thus, although the data storage management layer 250 has been exemplified in FIGS. 2 and 4 as if it were one standalone system (or two systems, 250 and 255), in some example cases it can be a functional layer distributed over several components. For example, it can be a functional layer distributed across some or all of control units $CU_{1-n}$.

Figure 5:
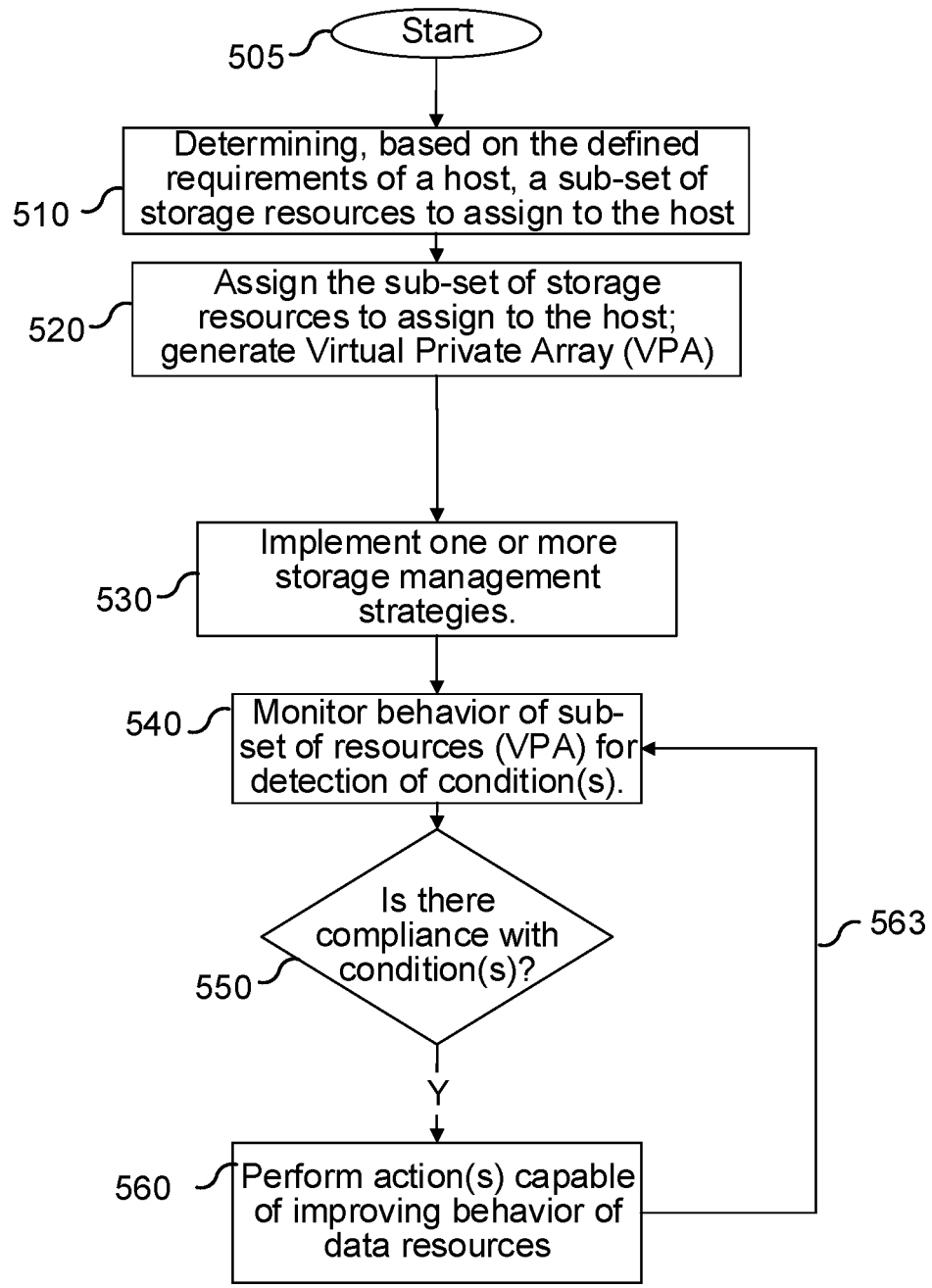
FIG. 5 illustrates a flowchart of a sequence of operations carried out for data storage management according to some examples of the presently disclosed subject matter.

Turning to FIG. 5, it shows a flowchart of operations performed according to some examples of the presently disclosed subject matter. In some examples, the process 500 of FIG. 5 can be utilized to perform operations such as were disclosed further herein with regard to FIG. 3. Operations described with reference to FIG. 5 (as well as to FIG. 6 below) can be executed for example, by storage management layer 250, and more specifically by orchestrator modules 440 described above. It should be appreciated, that while some operations of FIG. 5, as well as of FIGS. 5-9, are described with reference to the illustrated components and sub-components of data center 200 mentioned above, this is done by way of example only, and should not be construed to limit the operations to being implemented on such components alone, as the same operations can be executed using a storage system having an alternative system design.

The process 500 may start at block 505. According to some examples, a determination is optionally made, based on the defined performance requirements of a particular host, with respect to the sub-set of the plurality of storage resources to assign to the host (block 510). This can be done e.g. by management layer 250, for example using the orchestrator module 440. This sub-set will include at least one control unit and at least one storage unit. These requirements may in some examples relate to performance of I/O operations between the host and its data storage, for example as disclosed with regard to FIG. 7.

According to some examples, the pre-determined sub-set of the plurality of storage resources is optionally assigned to the host, thereby generating one or more Virtual Private Arrays (VPAs) associated with the host(block 520). This can be done e.g. by the orchestrator module 440. Note that blocks 510 and 520 can be performed for more than one host that is to receive storage resources.

In some examples, this step can also include generating topology information characterizing the VPAs. This information can be utilized when performing further steps in this method, as well as when performing the methods disclosed further herein with regard to FIGS. 7-9, 11.

Blocks 510 and 520 result in the initial topology of the VPAs and of the data storage system 150. According to some examples, the storage management strategies disclosed with regard to FIG. 3 will attempt to ensure compliance of each VPA to the requirements of its associated host, by dynamically modifying this initial topology as the need arises. Note that in some examples, blocks 510 and 520 are performed by systems that are not part of management layer 250.

According to some examples, one or more storage management strategies may be implemented (block 530). This can be done e.g. by orchestrator module 440. In some examples, the orchestrator module deploys the conditions of the relevant strategies in memory 420 for ongoing monitoring purposes. In some examples, these strategies may have been generated or updated, and output to orchestrator module 440, by strategy engine 450. In such an example, the orchestrator module receives the strategies. In some examples, the strategy engine may have generated or updated the strategies based on an analysis or learning process, as disclosed further herein, with reference to FIGS. 7-9. In some examples, the strategies are received by input from another module or system. In some cases, this input is automatic. In some examples, the strategies are received by input by a human operator.

In some examples, a storage management strategy can include one or more rules for assigning storage resources to the VPA(s) of the host in a dynamic manner. Each rule can comprise one or more conditions, and one or more actions associated with each condition. In some examples the actions are resource re-assignment actions, for re-assignment of one or more storage resources (e.g. CUs and SUs). Examples of conditions and actions in a strategy have been disclosed with regard to FIG. 3. The orchestrator module can in some examples store strategies and rules in memory 420. In some examples, one or more storage management strategies may be input manually by an operator (or provided over a communication network from a remote resource). As one non-limiting example, an operator or an external system can input to orchestrator module 440 the strategy associated with ticket sales for Friday at 9 AM. As another example, an operator can initially input the strategy associated with Black Friday sales. After several years, after the Black Friday pattern may have been identified and learned by the strategy engine 450, using methods exemplified further herein with regard to FIGS. 7-9, it may be the strategy engine that inputs the Black Friday strategy into orchestrator module 440 or into strategy engine 450.

According to some examples, behavior/performance of the sub-set of storage resources that were allocated to each VPA is monitored (block 540). This can be done e.g. by orchestrator module 440. This monitoring may in some examples include monitoring of service performance and/or utilization parameters of the resources. This can also include monitoring health of the resources (e.g. determining whether they are in a failed state) and of time parameters, such as the current time and date and day of week (e.g. as described with regard to FIG. 3). The monitored performance is analyzed to determine whether conditions specified in strategy rules are met or complied with by the set of storage resources (block 550). As indicated further herein, the condition may in some cases include a parameter going above and/or below a threshold value.

In addition to sampling, sampled data has to be stored either locally in the data center, or remotely, for example in the cloud.

In some examples, the actual sampling of data of performance of the sub-set of storage resources can be performed by the orchestrator module 440. In some examples, the sampling of this data can be performed by sampling module 465, which can then pass the data on to the orchestrator module. The sampling module may in some examples make use of topology information to learn which resources should have their performance monitored. According to some examples, in block 560, responsive to detection (in block 550) of compliance of the sub-set of storage resources associated with a particular VPA with the one or more conditions, one or more actions capable of improving performance of VPAs may be performed. In some examples, these may be actions to improve at least one of service performance and utilization of data resources. In some examples, the actions may be resources re-assignment actions, that perform re-assignment of one or more control units and/or storage units. Example actions are disclosed with regard to FIG. 3. This can be done e.g. by orchestrator module 440.

In the case of resources re-assignment actions, in some examples the orchestrator module 440 can generate one or more computer instructions for the one or more resources re-assignment actions associated with the condition that was met. For example, computer instructions can be sent to the control unit, for causing the control unit to execute the re-assignment action. An example, as described with regard to FIG. 3, is that the time is now Tuesday at 8:50 AM, and thus re-assignment of CU5 from VPA 2 to VPA 1 should now occur. Computer instructions to that effect can be generated.

According to some examples, management layer 250 can send these computer instructions to relevant control units over the communication network. This can cause the control unit to execute the instruction, and to perform actions of re-assignment of CUs and/or SUs, and thus updating of one or more VPAs. The VPA can thereby be adapted to the pre-defined performance requirements of the relevant host. For example, in the case described with reference to table 310, CU5 may receive an instruction, and thus VPA 1 may be adapted by receiving the additional CU, so as to provide it with the necessary IOPS performance required for the ticket sales peak event. In one example, an instruction may be sent to de-assign CU5 from VPA 2, followed by an instruction to assign CU5 to VPA1. Performing resources re-assignment action(s) can result in a topology change of one or more VPAs, and thus of the data storage system. Note that this example is of sending an instruction to another component such as control units. In other examples, such re-assignment can be performed by configuration changes implemented in the memory or storage of management layer 250 itself In some examples, management layer 250 can be a functionality residing on one or more control units, and thus the action can in some cases be performed directly on the control units without need for sending instructions between components. In some examples, performance of the actions, such as for example sending of the computer instructions for the resources re-assignment action(s), may be performed autonomously by management layer 250. This can enable the system to dynamically and autonomously adapt resource allocation to, for example, changes in performance of storage resources and/or time-dependent resource requirements, and thereby maintain the required storage service performance on one hand while improving the efficiency of resource utilization on the other hand. This may in some examples result in improved overall performance of one or more VPAs, as compared to systems that require operator intervention to monitor VPA performance and perform corrective actions, since a dynamic and autonomous re-assignment based on automated monitoring of conditions may cause the required resources to be assigned before any degradation of performance begins to occur.

In some examples, all or of some of these computer instructions may first be sent via a User Interface to a human operator, and a confirmation action by the human operator may be required, before management layer 250 sends the computer instruction to the relevant control units. In some cases the computer instructions can be sent over an application programming interface (API).

Note that the monitoring activity (block 540) can be repetitive. In some examples, the management layer 250 can repeat the monitoring, for compliance of the sub-sets of resources in the various VPAs to conditions comprised in the strategies' rules. In each such case of compliance, the management layer can perform the corresponding action or actions in block 560, and repeat the monitoring.

In some examples, the monitoring (block 540) may also include an additional step. The data storage management layer 250, for example, can receive one or more storage management strategy updates, associated with a particular strategy for which monitoring is already being performed. This updated strategy can include one or more updated rules for assigning storage resources to the host in a dynamic manner. Each updated rule can include one or more updated conditions, and each updated condition can include one or more updated actions capable of improving VPA performance. Rules can be added or modified, as part of a strategy update. One non-limiting example of such an update may be that the strategy engine 450 has determined (per methods disclosed further herein) that for a particular strategy, the updated condition may be "latency goes below 1 millisecond", where the previous condition had been "latency goes below 1.5 millisecond". Another non-limiting example is that the resources re-assignment action for that strategy has been updated, from e.g. "add 1 CUs" to the particular VPA to "add 2 CUs". In some examples, such updates to existing strategies can be generated on a periodic basis, e.g. daily or weekly. In some examples, in response to receiving the strategy update(s), the management layer 250 (for example) can set the strategy update to constitute the storage management strategy, set the updated rule(s) to constitute the one or more rules, set the updated condition(s) to constitute the one or more conditions, and set the updated action(s) capable of improving VPA performance to constitute the one or more actions capable of improving performance of VPAs. The management layer can then repeat the monitoring of VPA performance for detection of their compliance with the conditions of the now-updated strategy.

Figure 6:
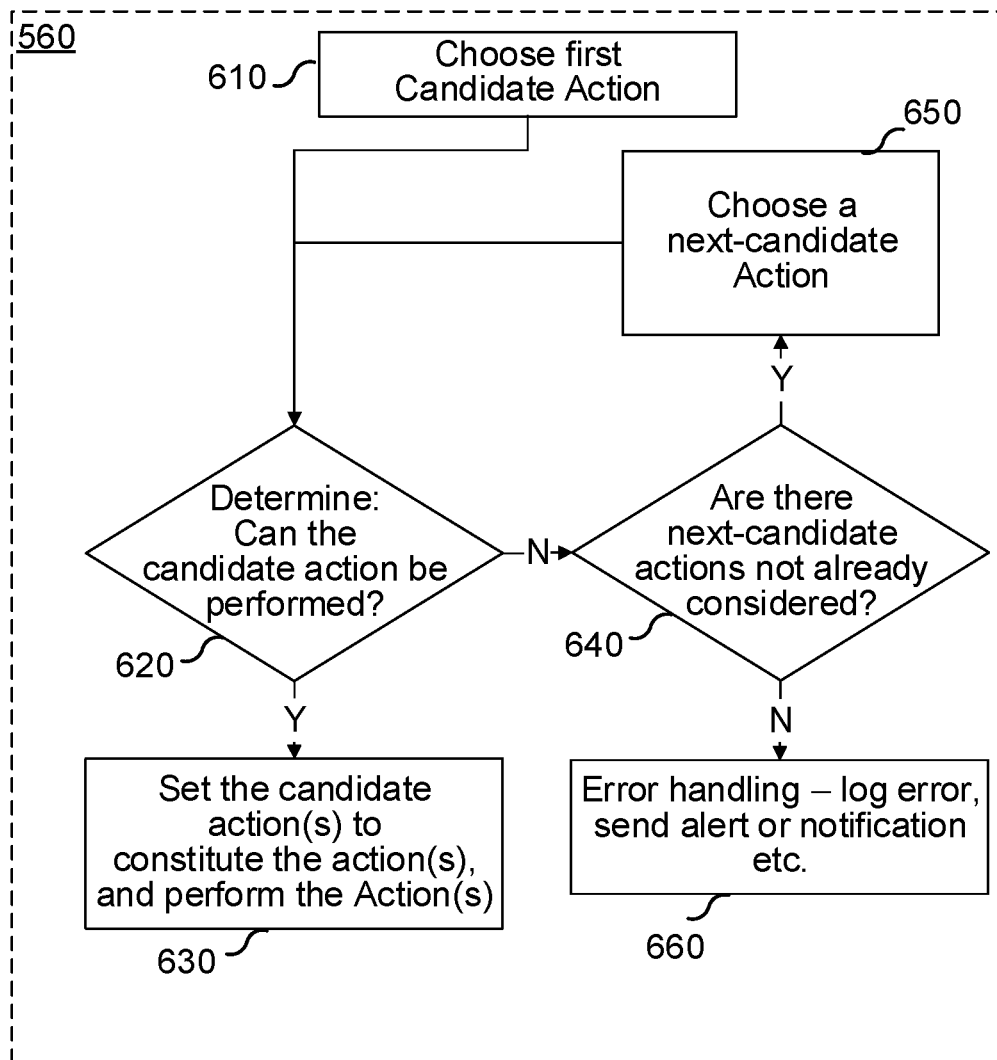
FIG. 6 illustrates a flowchart of a sequence of operations carried out for data storage management according to some examples of the presently disclosed subject matter.

Turning to FIG. 6, it shows a flowchart of operations performed according to some examples of the presently disclosed subject matter. FIG. 6 describes details of a possible implementation of block 560 (shown as the dotted line). This process may start at block 610. According to some examples, the condition that was met in block 550 may have been associated with a plurality of actions capable of improving VPA performance, in some cases comprising a set.

In block 610, a first candidate action capable of improving VPA performance can be chosen, from the plurality of actions. This can be done e.g. by orchestrator module 440. In some examples, the set of actions can be ordered by priority, and the first candidate action may be the highest-priority action in the set. As one non-limiting example, it may be that the preferred action in a particular strategy is to add resources to VPA 1 by taking them from the free pool of spares, and that the second-preference action is to add resources to VPA 1 by taking them from VPA 2 only if there are none in the free pool and there are available resources at VPA 2. Another non-limiting example may be that the preference is to take a resource from a VPA that has little need for the resource, and, only as a second preference, to take it from the free pool. One example rationale for such a preference may be that resources in the pool are maintained in a sleep mode, that consumes less power.

In some examples, each candidate action can comprise not one individual action, but rather a set of individual candidate actions that are to be performed as a set.

According to some examples, in block 620 a determination may be made whether or not the candidate action can be implemented (block 620). This can be done e.g. by orchestrator module 440. A non-limiting example of inability to implement an action may be that the unit to be re-assigned is locked, that the unit is busy, that the unit has failed, or that communication to the unit has failed, and thus a re-assignment action cannot be performed. Another non-limiting example may be that the candidate action is to send an alert to a control center, but communication to the control center has been lost.

According to some examples, in response to a determination that the candidate action can be implemented, the candidate action(s) may be set to constitute the action(s), and the action(s) performed (block 630). This can be done e.g. by orchestrator module 440. According to some examples, in response to a determination that the candidate action cannot be implemented, a determination may be made whether there are one or more next-candidate actions associated with the met condition which have not already been considered (block 640). This can be done e.g. by orchestrator module 440.

According to some examples, in response to a determination that there are one or more next-candidate actions which have not already been considered, one of the next-candidate actions may be chosen, and may be set to constitute a candidate action (block 650). This can be done e.g. by orchestrator module 440. The process can then revert back to block 620. According to some examples, where the actions were in an ordered set of priority, the next-candidate action to be chosen may be the next-highest-priority action of the at least one action capable of improving VPA performance. One example action may be to wait for a defined time period. Another example action may be to re-assign a resource from, for example, a second-choice VPA.

According to some examples, in response to a determination there is not at least a next-candidate action which has not already been considered, a determination may be made that no action can be performed to implement the strategy associated with the condition that was met in block 550 (block 660). This can be done e.g. by orchestrator module 440. In some examples, no action may be taken. In some examples, an indication of the error situation may be generated, e.g. as a log record, an alert sent to a system, or a notification sent to an operator. In some examples, in block 660 the orchestrator module can indicate to the strategy engine 450 that no action could be taken. The orchestrator module can also request the strategy engine to perform analysis for the VPA and to generate an additional or updated storage management strategy, per e.g. the methods disclosed herein with regard to FIGS. 7-9. This additional or updated strategy is the strategy to be output to the orchestrator module for implementation. This is one non-limiting example of a situation where orchestrator module 440 can provide to strategy engine 450 feedback about strategy implementation and can request additional or updated strategies.

Figure 7:
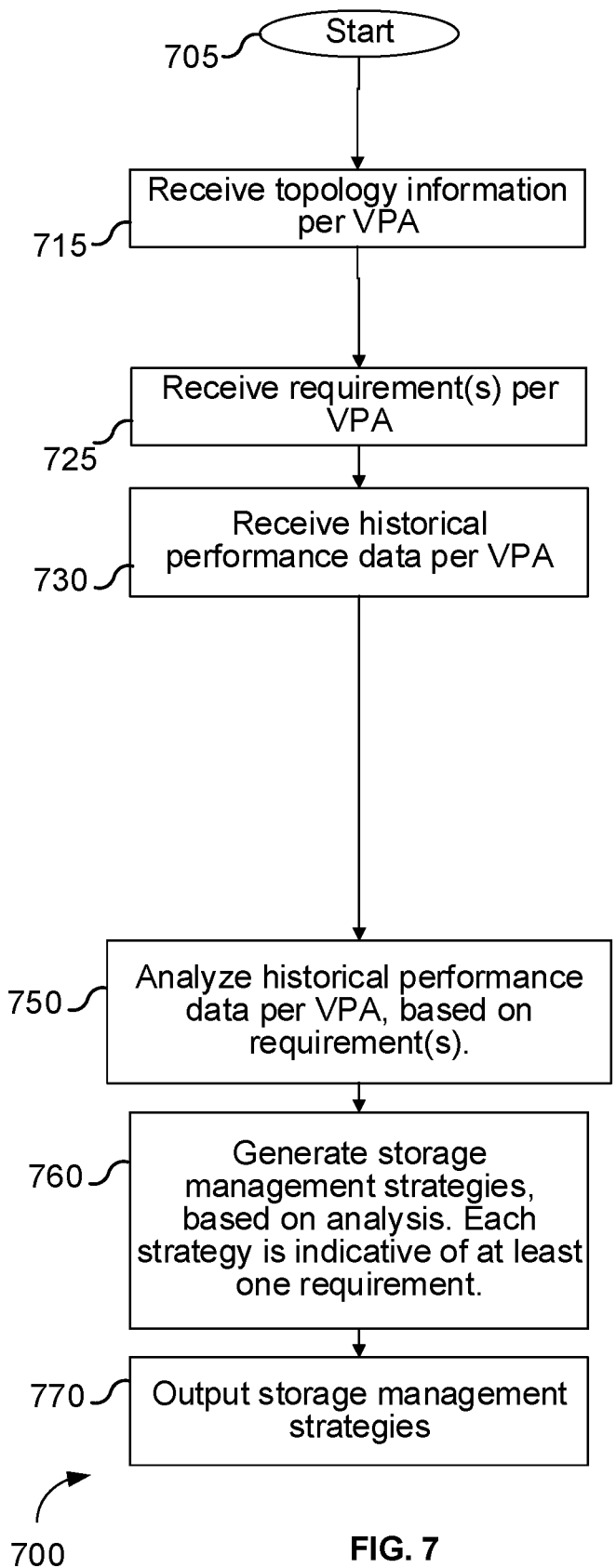
FIG. 7 illustrates a flowchart of a sequence of operations carried out for data storage management according to some examples of the presently disclosed subject matter.

Turning to FIG. 7, it shows a flowchart of operations performed according to some examples of the presently disclosed subject matter. Operations described with reference to FIG. 7 (as well as to FIGS. 8 and 9 below) can be executed for example, by storage management layer 250, and more specifically by strategy engine module 450 described above.

The process 700 may start at block 705. According to some examples, topology information characterizing one or more VPAs associated with one or more hosts is received (block 715). The topology information may in some examples describe which storage resources (control units and/or storage units) are assigned to which VPAs, and are associated with which host computer devices. In some examples, this information can include physical location (address, city, region etc.) of storage resources and of hosts. This can be done e.g. by strategy engine module 450. This step is optional. In some examples, this information may already be present in the module.

According to some examples, one or more requirements associated with a particular VPA can be received, that provides storage services to a particular host or hosts (block 725). This can be done e.g. by strategy engine module 450. Note that step 725 can be performed for more than one host that is to receive storage resources. In some examples, the requirement can be set to attain compliance with a Quality of Service (QoS) level, or a Service Level Agreement (SLA), associated with a host. In some examples, such VPA requirements can be indicative of a storage service performance requirement and/or a resource utilization requirement. One non-limiting example may be that read-write latency should be less than 1 ms in 97% of cases. Another non-limiting example may be that IOPS performance should be at least 1 million IOPS in 95% of cases. These requirements can serve as an input to the analysis step described below.

One non-limiting example of an SLA is presented herein, in order to clarify some possibilities for generating strategies. The data storage system may in this example provide three levels of service: gold, silver and bronze. Customers can choose the level, based on trade-offs between the cost of the SLA and the level of services guaranteed, as expressed in requirements on parameters such as, for example, read-write latency, IOPS and availability of resources. According to some examples, the SLA may define the relative priority of the customer in terms of access to the storage resources. In one example, the gold customer may be guaranteed 97% availability, while the silver customer may be guaranteed only 95% availability. In another example, the gold customer may be guaranteed latency of less than 1 millisecond (ms) 97% of the time, while the silver customer may be guaranteed latency of less than 1 ms only 95% of the time, and the bronze customer may be guaranteed latency of less than 1 ms only 90% of the time.

According to some examples, there can be more than one requirement on a VPA. As one-limiting example, the VPA can have both normal-operation and worst-case-operation requirements, for example less than 1 ms for 95% of the time but less than 5 ms for 99% of the time.

Another example requirement may consider the number of storage resources. For example, it may be a requirement that VPA 7 should never be allocated more than 20 control units and 70 storage units. Similarly, if there are multiple models of resources, this consideration can factor into the requirements—for example, that VPA 8 should be allocated a maximum of four of the high-performance control unit model and a maximum of twelve of the low-performance control unit model. In some examples, there may have several versions of a unit (e.g. a control unit), each that implements a different data reduction scheme such as a compression algorithm. In such an example, a requirement on data reduction ratio may drive a strategy that assigns to a VPA a unit type based on its data reduction scheme. Note that in some examples, the data reduction scheme implementation may be f in hardware, in software or in both.

The SLA associated with a VPA can play a role in generating strategies elsewhere in process 700. For example, a strategy can indicate that if a gold VPA requires more resources, and no free pool resources are available, it should be assigned resources from a bronze VPA if possible, and otherwise from a silver VPA. The strategy for a bronze VPA may be to assign it the required resources only from the free pool, or perhaps also from another bronze VPA. In another example, strategies for a higher-SLA VPA may maintain a relatively higher availability, e.g. requiring that the storage resources allocated to the VPA represent more than one spare resource above the number needed to provide the service.

In some examples, the requirements can be input by an operator. In some examples, the input can be from another computer system. Input to the management layer 250 can in some examples be done via external interface module 470. The module can in some examples store these requirements in memory 420.

In some examples, the requirement can be time-based. One example may be that a shorter read-write latency is required, for a VPA serving a host running a TV voting show, on Tuesday and Thursday nights, when the TV show is broadcast, compared to the latency required for the VPA during the rest of the week. Other examples may relate to performance during work hours, as compared to evenings and weekends, or on a particular annual holiday.

In some examples, these requirements can also include budgetary restrictions or targets associated with the resources allocated to a VPA. In some examples, the budget can be defined in terms of maximum number of control units and of storage units to be assigned to the host. In some examples, the budget can involve a cost aspect, such that the host may be allowed a larger quantity of a lower-cost unit, and a smaller quantity of a higher-cost unit (e.g. a newer technology unit, e.g. a higher-performance unit).

According to some examples, historical performance data, which is indicative of the past performance of a VPA, may be received (block 730). This may be done e.g. by strategy engine module 450. Non-limiting examples of such data can be tables associated with a particular VPA or host, where the tables record contain data such as, for example: time and date of the record; counters indicating parameters such as latency, IOPS and throughput; physical and logical storage capacity; CPU, storage and network utilizations; indications identifying the resources used; and failure conditions (e.g. "CU2 was failed during the time associated with this record). The module can in some examples store these requirements in memory 420. In other examples, this data can be stored in management layer storage 430.

In some examples, the actual sampling of historical performance data can be carried out by the strategy engine module 450. In some examples, the sampling of this data can be carried out by sampling module 465, which can then pass the data on to the strategy engine module.

According to some examples, an analysis is performed of the historical performance data. The analysis can be based on the VPA requirements received in block 725. In some examples, it can be based as well as on the received topology information (block 750). This can be done e.g. by strategy engine module 450. For example, points in time where the SLA was met can be identified or learned. In some examples, the analysis can be performed utilizing machine learning.

The management layer can in some examples identify characteristics in behavior traffic levels, and in performance, of a VPA. In some examples, trends can be identified. In some examples, the characteristics and trends can be associated with specific time periods (e.g. "latency tends to increase on Mondays between 8 and 10 AM, and for X % of the time is above the required limit associated with the SLA").

According to some examples, based on the analysis, one or more storage management strategies per VPA or host may be generated (block 760). This can be done e.g. by strategy engine module 450. Each such strategy can comprise one or more rules for assigning storage resources to the relevant host in a dynamic manner. As described elsewhere herein, these rules can comprise conditions and associated actions. The storage management strategies for a VPA may be indicative of one or more requirements for that VPA. In some examples, the generation of the one or more storage management strategies can be performed utilizing machine learning.

One non-limiting example of a generated strategy may be as follows: the VPA is categorized as gold, and the requirement is guaranteed latency of less than 1 millisecond (ms) 97% of the time. As a result of analysis, the strategy engine module 450 may learn that adding a control unit when a latency threshold of 1 ms is crossed may be "too late", and may result in occasional latencies over 1 ms, such that the 97% guarantee cannot be met. The strategy engine may for example learn that adding a control unit when the latency is only 0.8 ms will make sure that the resource re-allocation occurs early enough to enable the 1 ms requirement to be met 97% of the time.

Similarly, in some examples, the steps of analysis and generation of strategies can involve generating several strategy candidates and evaluating them. For example, in the above-described scenario, the strategy engine can in some cases suggest two options: adding 1 control unit at a threshold of 0.8 ms latency, and adding 2 control units at a threshold of 1 ms. It can then determine which of these options should be chosen as the preferred strategy to generate to be used by, for example, orchestrator module 440.

It also should be noted that different strategies can involve adding different numbers of resources. For example, in a VPA with four control units, adding one more may very well provide the needed performance improvement. On the other hand, in a VPA with 100 control units it may be likely in some examples that a strategy may call for adding a much larger number of control units in response to compliance with the relevant condition.

According to some examples, the storage management strategies may be output (block 770). According to some examples, the storage management strategies can be output from the strategy engine module 450, e.g. to the orchestrator 440. The orchestrator can in some examples then, for example, perform some of the steps disclosed with regard to FIG. 5. Thus the storage management strategies output by the strategy engine module can in some examples be capable of being utilized by the data storage management layer to 250 perform actions to implement the storage management strategy in the data storage management system in a dynamic manner, in some examples improving VPA performance.

According to some examples, the process 700 can also include receipt of at least one initial storage management strategy. In some examples, this may occur before step 750, e.g. in parallel with 715, 725, and/or 730. This can be done e.g. by strategy engine module 450. In some examples, the initial storage management strategy can be manually entered by an operator, via the External Interface Module 470. In some examples, the initial storage management strategy can be received from an external system via the External Interface Module. This step is not shown in FIGS. 7-9. In some examples, the analysis of data, and generation of strategies, performed further herein, can be based on this initial storage management strategy. In some cases, the initial storage management strategy can serve as a basis on which the analysis (e.g. block 750) is done. In some cases the generated storage management strategy (e.g. block 760) may be an adaptation, improvement, modification or replacement for the initial storage management strategy.

In some examples, the process can be a combination of steps disclosed with regard to FIGS. 5 and 7, and can be implemented using a combination of strategy engine module 450 to orchestrator module 440. For example, the process can comprise the method 700, followed by these steps: 530, 540, 550, 560, 570 and 563.

In the examples described above, making reference to FIG. 4, the strategy engine module 450 and the orchestrator 440 can, according to a non-limiting example, be located in, or associated with, the same management layer 250. In other examples, each module can reside on separate management layers, e.g. 250 and 255. In such cases, the generation and output of strategies per FIG. 7, and the implementation of strategies so as to effect actions per FIG. 5, can be performed by separate management layers 250 and 255.

In one non-limiting example, the strategy engine might generate several options that make trade-offs in SLA vs number of resources needed. In one non-limiting example case, the required SLA may be achieving a certain physical storage capacity 93% of the time. Option 1 generated may be adding two storage units to provide an SLA of 90%, and option 2 may be adding four storage units to provide an SLA of 95%. In some examples, the strategy engine may determine in block 760 which option is better. It can for example make use of the What-If Simulator module 460, as disclosed furthered herein regarding FIGS. 10-11.

In another non-limiting example, the requirement may be that no resources be added to a particular VPA, and the strategy engine can choose, based on the VPA requirements and on the resource constraint, between two strategy options—one that provides better average performance (e.g. less than 1 ms latency in 80% of cases), and another with worse average performance, but better performance in peak periods (will e.g. provide less than 5 ms latency in the heaviest peak periods). Both strategies may be identified as a result of the analysis, but customer preferences may drive the requirements, which in turn may drive the strategy chosen by the strategy engine. Still other customers may want a balance between the two performance levels, and their more complex requirement may drive yet a third strategy.

In other examples, the strategy engine can present the multiple derived strategies to an operator, e.g. via the external interface module 470, and ask the operator in block 760 to choose the option that should be the strategy to output.

According to some other examples, in block 760 several different strategies can be generated by strategy engine 450. In some cases, they can be generated as an ordered set of storage management strategies, wherein the ordered set is ordered from a highest-priority storage management strategy to a lowest-priority storage management strategy. An orchestrator module 440 implementing such strategies can attempt to give priority to higher-priority strategies as compared to lower-priority strategies.

As one non-limiting example, a higher-priority strategy may be to add two storage units to provide an SLA of 90%. If the orchestrator determines in its monitoring that this does not meet that requirement, it may then try the lower-priority strategy of adding four storage units to provide an SLA of 95%. In some examples, a set of storage management strategies may be sent to the orchestrator module along with instructions regarding in which situations to apply each strategy within the set. As another non-limiting example, the set of strategies may include a normal-case strategy and an abnormal-case strategy. The orchestrator module may be instructed to run the normal-case strategy as a default. However, if the orchestrator module receives an alert of a storm approaching New York, for example, where IOPS may be expected to be e.g. 10 times the normal level, the orchestrator module may be instructed in such an extreme situation to run the abnormal-case strategy instead, for the duration of the storm. For example, consider a customer with two VPAs—a production VPA 1 and a development VPA 2. The default Strategy 1 may be to ensure that VPA 1 has latency below 1 ms, while development VPA 2 has latency below 3 ms. There may also be generated Strategy 2 for an abnormal case—if there is a natural disaster, maintain VPA 1 latency below 1.5 ms, and development VPA should be set for "best effort" latency with no guarantee.

In some examples, the structure of the strategy generated may be one strategy with multiple cases, rather than multiple strategies that have instructions on when to apply each.

Note that the division of functionality between orchestrator module 440 and strategy engine 450 disclosed herein is one non-limiting example. In other examples, the orchestrator module can be configured with logic that allows it to determine what strategies to apply, for example in a case where it loses communication with the strategy engine or the strategy engine is down. Similarly, in some examples the enrichment data parameters and/or the interrupt event or ad hoc data parameters disclosed further herein can be input to the orchestrator module as well as to the strategy engine. For example, a pre-defined strategy may be implemented, that if the German stock index drops more than 20%, a certain number of resources should be added to the VPA associated with the French stock exchange.

Figure 8:
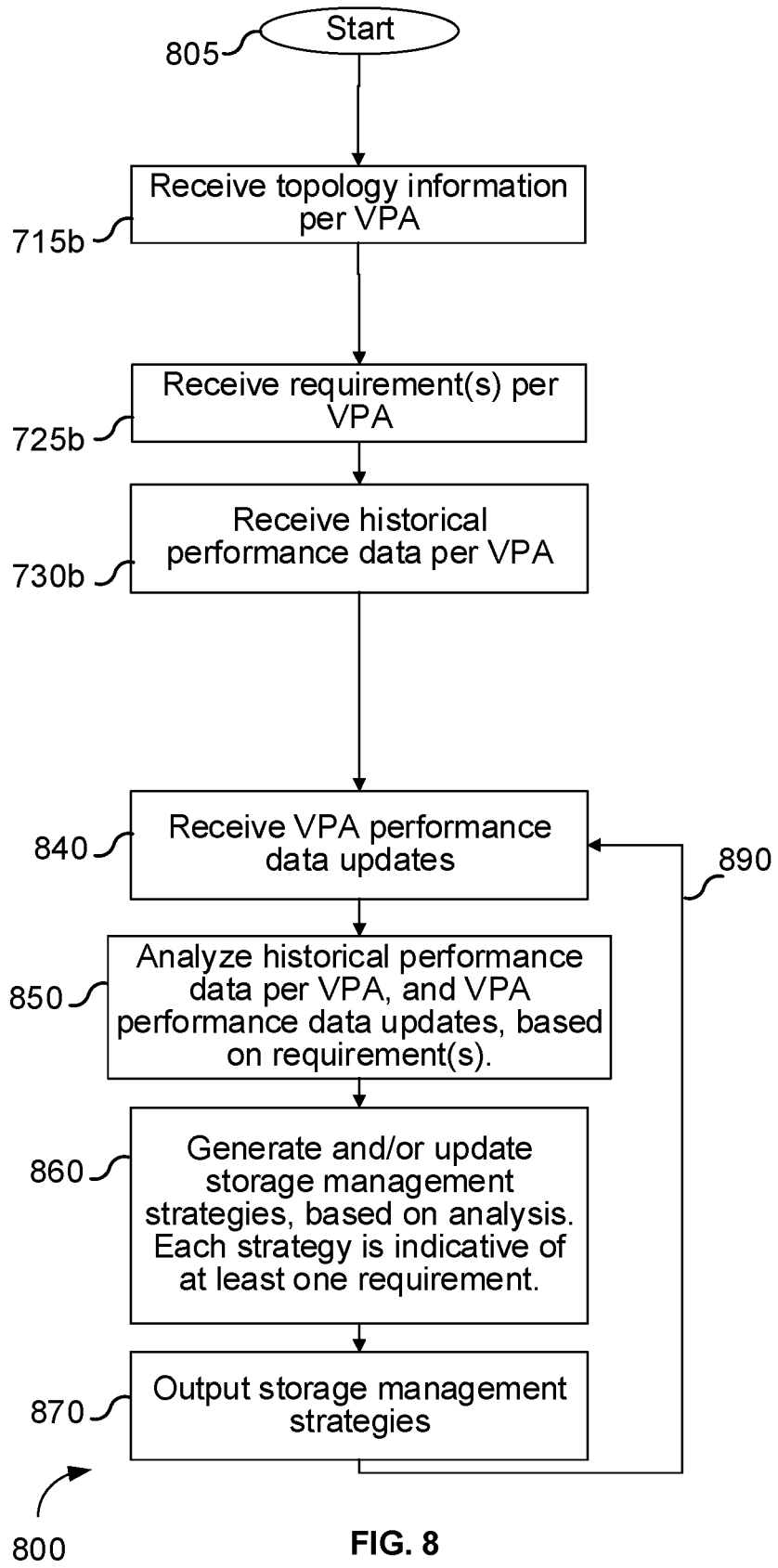
FIG. 8 illustrates a flowchart of a sequence of operations carried out for data storage management according to some examples of the presently disclosed subject matter.

FIG. 7 describes a basic process, wherein storage management strategies for a VPA are generated and output once. According to some examples, a modified version of this process may be used. Turning to FIG. 8, it shows a flowchart of operations performed according to some examples of the presently disclosed subject matter. The process 800 may start at block 805. Blocks 805, 715*b*, 725*b*, 730*b* can in some examples be the same as 705, 715, 725, 730.

According to some examples, the data indicative of VPA performance updates may be received (block 840). This can be done e.g. by strategy engine module 450. This may occur, for example, periodically, where the latest data indicative of VPA performance can be uploaded from an external system to the storage 430 of the management layer every few minutes or hours, or perhaps daily or weekly. In some examples, the actual sampling of data indicative of VPA performance updates can be performed by the strategy engine module 450. In some examples, the sampling of this data can be performed by sampling module 465, which can then pass the data on to the strategy engine module. The sampling module can in some examples make use of topology information to know for which resources to sample data.

According to some examples, the historical performance data, along with data indicative of VPA performance data updates, may be analyzed (block 850). This can be done e.g. by strategy engine module 450. The analysis can be based on the VPA requirements received in block 725*b*. The method of block 850 may in some examples be similar to that of 750, with the addition that the analysis is also based on the received data indicative of VPA performance data updates.

According to some examples, based on the analysis, one or more storage management strategies may be generated per VPA or host (block 860). This can be done e.g. by strategy engine module 450. The method of block 860 can in some examples be similar to that of 760, with the addition that the generation of storage management strategies is also based on, and is indicative of, the updates of the at least one set of historical performance data. The method of block 860 can in some examples also involve generating one or more new storage management strategies, and/or generating storage management strategy updates to existing storage management strategies. In some examples, the management layer can then set the least one new storage management strategies and/or the storage management strategy updates to constitute the storage management strategies, and output these storage management strategies. Similarly, certain storage management strategies that had been previously generated, can be deleted as no longer relevant, and the output can indicate to the receiving system or function (e.g. orchestrator module 440) to delete the particular strategy and stop using it when monitoring performance. In such a manner, the strategy engine 450 can in some examples cause the storage management strategies that are being used by e.g. orchestrator module 440 to be the most updated and relevant ones, in light of the updated performance data.

As one non-limiting example, on Tuesday the previous strategy may have resulted in adding two storage units to VPA 4. On Thursday, the strategy engine may analyze the historical and the updated data, and may learn that there are better strategies to address the requirement. It can then generate and output an updated storage management strategy. Note that each storage management strategy update can comprise one or more updated rules for assigning storage resources to the host in a dynamic manner, and the updated rule(s) may comprise one or more updated conditions and one or more updated actions.

According to some examples, the storage management strategies may be output (block 870). The method of block 870 can in some examples correspond to that of 770. According to some examples, the process can revert back (arrow 890) to block 840. It can repeat the process of receiving data indicative of VPA performance updates, analyzing the data, generating and outputting strategies.

Figure 9:
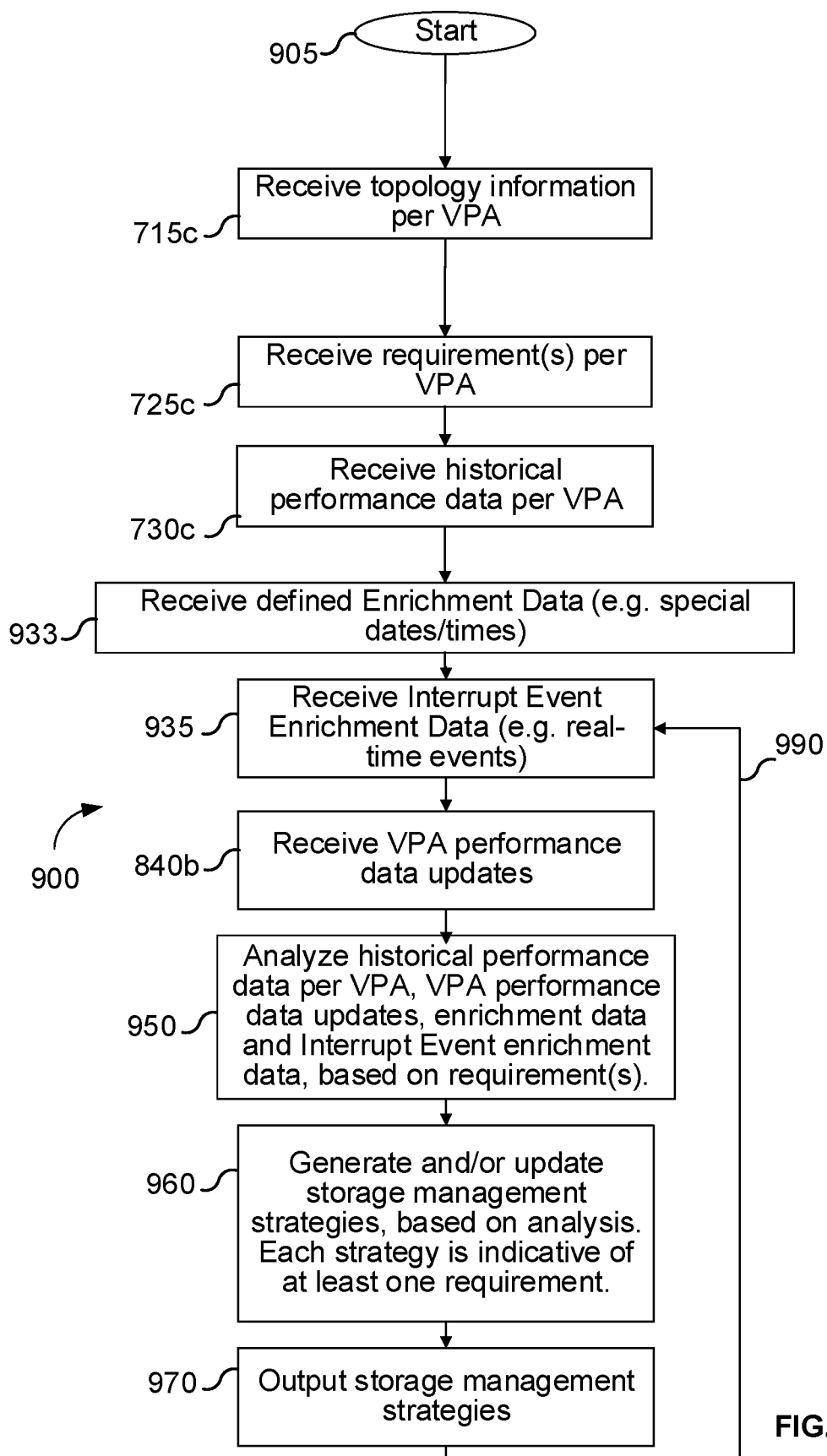
FIG. 9 illustrates a flowchart of a sequence of operations carried out for data storage management according to some examples of the presently disclosed subject matter.

Turning to FIG. 9, it shows a flowchart of operations performed according to some examples of the presently disclosed subject matter. The process 900 can start at block 905. Blocks 805, 715*c*, 725*c*, 730*c* can in some examples be the same as 705, 715, 725, 730.

According to some examples, one or more defined enrichment data parameters may be received (block 933). This can be done e.g. by strategy engine module 450. In some examples, an enrichment data parameter can provide additional information concerning performance data. In some examples, the at least one enrichment data parameter can be indicative of a defined time-based event, for example a scheduled event. For example, a parameter may be received indicating that certain VPA resource data is associated with a football game being broadcast at the time. In a further example, a parameter may be received indicating that a certain date is Mother's Day. Such data could be utilized, for example, in the analysis block, in learning and identifying trends in VPA performance associated with football broadcasts, or with Mother's Day. Other non-limiting examples of enrichment data parameters can be calendars, lists of holiday dates, lists of scheduled events (sports events, concerts etc.), locations (e.g. cities or regions) served by VPAs, a list of time zones served by VPAs, and weather forecasts.

In other examples, the enrichment parameters may include information on changes in the applications of the host(s) which is served by the particular VPA. For example, a host may run a human resources application for a company with 500 employees. If the company merges with a company of 250 employees, in some cases the application load may be expected to increase by about 50%. The analysis of historical performance data performed to generate the VPA strategy would look at historical patterns in light of the expected increased future load. Similarly, in some examples the updates to the historical performance data, occurring after the corporate merger, may be given greater weight in the analysis than the data for periods prior to the merger. Another example of such an application change is a host running two instances of a database, and the host owner decided to run two additional instances on the host. In still another example, a new application will be added to the host, and the input includes forecasted load data.

In some examples, the enrichment data parameter may be provided automatically to strategy engine module 440 from external sources via external interface module 470. In some examples, the enrichment data parameter can be entered by a human operator. The module can in some examples store these parameters in memory 420, or in management layer storage 430.

In some examples, the enrichment data parameter can be a machine-learned parameter. For example, via machine learning, the management layer can identify which are high- and low-activity periods of the week as related to a particular VPA, and can use these periods of time as enrichment data parameters to be used in analyses.

According to some examples, one or more interrupt event enrichment data parameters may be received (block 935). This can be done e.g. by strategy engine module 450. In some examples, these are enrichment parameters indicative of events that are ad hoc, and not scheduled. In some cases, an interrupt event enrichment data parameter can be indicative of an event occurring in real-time, or in near-real-time.

One non-limiting example of an interrupt event or ad hoc data parameter may be an indication that a storm is developing and will be reaching the Northeast Coast in a certain time frame, in a case where the VPA provides services to a host of the electric company or of the police. Similarly, an alert of occurrence of an earthquake or hazardous-materials spill may trigger a near-immediate change in the storage resources strategy for e.g. emergency services departments and hospitals.

Another example of an interrupt event is a VPA associated with trades in a New York stock exchange. An alert may arrive as an interrupt event enrichment data parameter that there was very large trading in a Tokyo exchange, and/or that there were large index drops in the Tokyo exchange. Such a parameter can be indicative of an unusually large trade volume to be expected in New York. Such interrupt event data can be useful in adding to the analysis, and in generating a strategy that indicates that these VPAs should receive more (or possibly fewer) resources at least for the duration of this interrupt event. In a third example, an interrupt event indicating a large index drop in the German exchange, or an abnormally large trading volume there, may be an input for generating a strategy update for a VPA associated with the French exchange. In this example, both exchanges are active at the same time, and the event in Germany may in some cases cause a large volume increase in trading on the French exchange, within a matter of minutes.

In some examples, these interrupt event data can be input by human operators as they become aware of these events. In other examples, the interrupt event data can be input into strategy engine module 450 in an ongoing and automated fashion, via the external interface module 470, from external systems that monitor such events (e.g. from the Weather Service or from stock markets). Block 940 can in some cases be the same as 840b.

According to some examples, the historical performance data, along with data indicative of VPA performance data updates, may be analyzed (block 950). This can be done e.g. by strategy engine module 450. The analysis can be based on the VPA requirements received in block 725b. The method of block 950 can in some examples be similar to that of 850, with the addition that the analysis is based also on the enrichment data parameters, and/or on the interrupt event enrichment data parameters.

According to some examples, based on the analysis, one or more storage management strategies may be generated per VPA or host (block 960). The method of block 960 can in some examples be similar to that of 860, with the addition that the generation of storage management strategies is indicative of, and may be based on, the enrichment data parameters, and/or on the interrupt event enrichment data parameters. This can be done e.g. by strategy engine module 450.

According to some examples, the storage management strategies can be output (block 970). The method of block 970 can in some examples correspond to that of 770 and 870.

According to some examples, the process can revert back (arrow 990) to block 940. It can repeat the receiving of interrupt event enrichment data parameters and data indicative of VPA performance updates, analyzing of the data, and generating and outputting strategies. In some examples, the process may instead revert back from 970 to 933, for example where enrichment data parameters are based on machine learning.

FIGS. 7-9 disclose only some non-limiting examples of implementation of the presently disclosed subject matter. Various combinations of the steps of these figures are possible. For example, in some cases blocks 933 and 935 may be done in process 750, e.g. between blocks 730 and 740.

In some cases, there may be example advantages in implementing methods such as those disclosed with regard to FIGS. 7-9. There may be advantages in generating storage management strategies in a dynamic manner, based on analysis of VPA requirements, historical performance data, updates in performance data and/or various types of enrichment data. Such analysis may better uncover trends, patterns of behavior and the like which apply to a particular VPA, and thus can, in some examples, result in strategies which are better customized to the requirements of the particular VPA. In some examples this will result in more optimized and efficient utilization of the available resources than will other methodologies for generating strategies, that may be based on a less comprehensive analysis. In some other examples, other methodologies may have to compensate by allocating to a VPA more storage resources than are really needed, to account for weaknesses in the analysis, and thus such other methodologies may result in less efficient use of the storage resources available.

In some examples, generating strategies based on real time or near-real time analysis of data, such as disclosed with reference to FIGS. 7-9, can result in generation of appropriate strategies in a more timely manner, and can thus enable implementation of the strategies at an earlier point in time, possibly before performance problems in a VPA develop. This can thus have the effect of improving the overall performance of the VPA, and meeting the requirements of the VPA(s).

In some examples, as the storage system size increases, as the number of VPAs for which strategies are required increases, and as the multiple strategies must be updated in light of new data on a more rapid and frequent basis, while in some cases simultaneously considering many or all of the VPAs in generating the strategy, analysis by operators may in some examples be unable to provide appropriate strategies in a sufficiently timely manner. In such cases, the advantages of dynamic and autonomous monitoring and action, in the areas of meeting VPA requirements and resource efficiency, become even more pronounced. Additionally, in some examples, multiple interrupt event enrichment data parameters may arrive autonomously in an ad hoc manner in near-real time from external systems, each parameter of which may be autonomously processed and analyzed, in some examples further dynamically affecting the strategies to be generated, and to be acted on, so as to adapt the storage resources allocation to the near-immediate needs of the hosts, in a manner that uses resources efficiently.

According to some examples, storage management strategies generated and output by the strategy engine 450, analyzed by the what-if simulator module 460 (disclosed further herein) and/or those input to orchestrator module 440, can be associated with a particular VPA, or with a particular set or group of VPAs. For example, a strategy can be generated to attempt to improve performance of one specific VPA, in some cases without consideration of the performance of the data center as a whole, encompassing the entire plurality of the resources. According to some other examples, the storage management strategy or strategies can attempt to consider the requirements of a larger set of VPAs, in some case addressing the requirements of all of the VPAs, or even all of the resources (including those in the free pool). As one non-limiting example, the strategy engine may have to prevent a case where both VPA 2 and VPA 5 are to simultaneously take the same control unit 6, by generating a strategy that accounts for that situation.

Thus, in some examples, the strategy engine can generate and output, and/or the orchestrator module can receive as an input, one single strategy which addresses the requirements and performance (past and/or predicted) of multiple VPAs, or of all VPAs. In other examples, the strategy engine can generate and output, and/or the orchestrator module can receive as an input, a single set of strategies which address the requirements and performance (past and/or predicted) of multiple VPAs, or of all VPAs. For example, if the storage system comprises several data centers, each located in a particular physical location, separate strategies can in some cases be generated and used for each physical data center location. In other examples, in such a situation one set of strategies can be generated and used that address the requirements of all locations simultaneously.

The above exposition discloses example uses of the strategy engine 450 for dynamically generating and updating storage management strategies and updating, for use by the orchestrator module 440. In some examples, the strategy engine can be used instead as a tool for operators. In such cases, the management layer 250 can be configured with a user interface to allow interactive operation with a human operator. It can display to the operator strategy options that are based on the analysis. The operator can then, in some examples, input those strategies directly to the orchestrator module. In other examples, where there is no orchestrator module, the operator can then manually perform re-configuration activities on the storage resources to implement the strategy of their choice.

Figure 10:
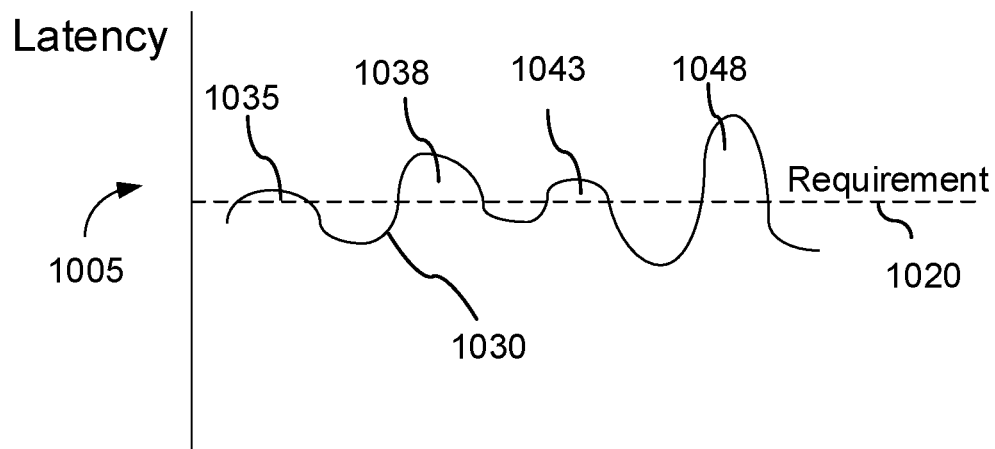
FIG. 10 illustrates simulations of performance data according to some examples of the presently disclosed subject matter.
Figure 10:
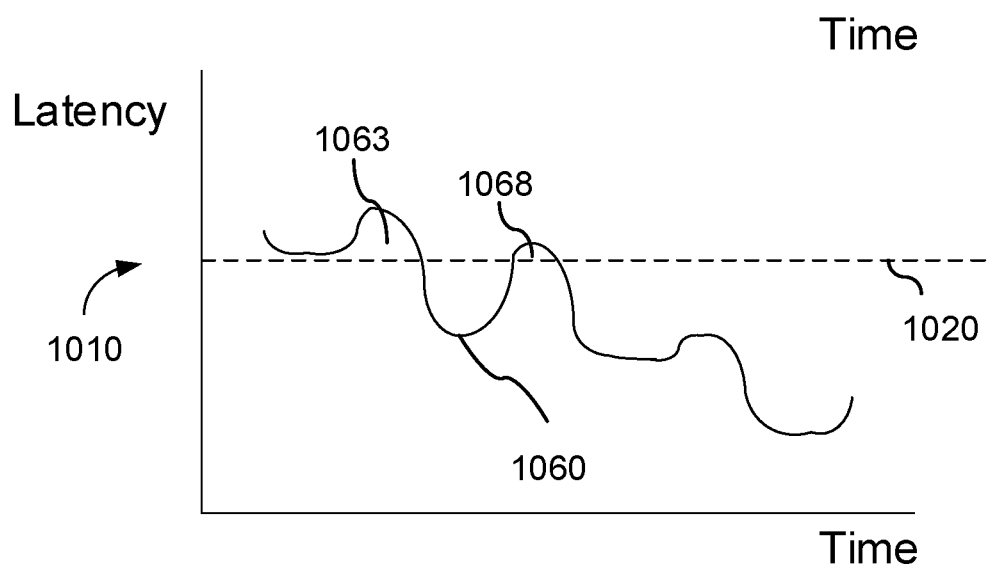
Figure 10:
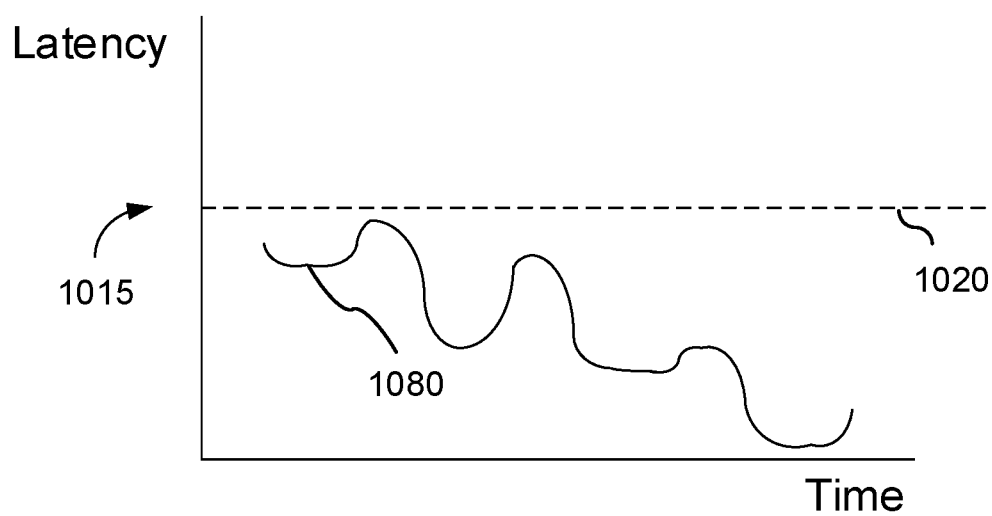

Turning to FIG. 10, it shows a graph of strategy simulations performed according to some examples of the presently disclosed subject matter. Operations described with reference to FIG. 10 can be executed for example, by storage management layer 250, and more specifically by what-if simulator module 460 described above.

According to some examples, simulation can be performed on a strategy, to verify its validity. In some examples, verification of strategy validity may include a verification of the ability of the strategy to meet the performance requirements of VPA(s), for example SLA requirements. In some examples, such a simulation process can be performed by what-if simulator module 460. According to some examples, inputs to the analysis and simulation process can include historical performance data, requirements of the VPA(s), and one or more proposed storage management strategies. In some examples, another input can be topology information characterizing the VPA(s). In some examples, the proposed storage management strategies may be sent to what-if simulator module 460 from strategy engine module 450, for verification that the strategies are likely to accomplish their goal, and thus should in fact be output to, for example, orchestrator module 440.

In some examples, a historical performance history can be simulated, based on the historical performance data, while applying the one or more proposed storage management strategies to the data. In some examples, each point in time in the historical performance data can be considered, to determine what the storage service performance values, and/or resource utilization values, for that point in time would have been, had the proposed strategy been applied. In this sense, the historical data can be said to be "re-run" while applying the proposed strategies. In some examples this can be done by the what-if simulator module. In some examples, the topology information can also be considered in the simulation. In some examples, enrichment data parameters can also be considered in the simulation. In some examples, one enrichment data parameter is number of each type of resource, whereby the impact of varying the number of assigned resources can also be considered in the simulation. Modified historical performance data may be generated. The simulation may, in some examples, be referred to as a "what-if" in the sense that the history of the VPA(s) is revisited in a scenario where the proposed strategy is applied to the VPA(s) as needed. In some examples, the modified historical data can be said to represent an "alternate history", or a "modified" history, in which the proposed strategy was applied to the VPA(s) as needed, and/or where a different number of resources were initially assigned to the VPA.

In some examples, the simulation can be performed using machine learning. As one non-limiting example of performing the What-If analysis based on machine learning, the What-If analysis model can be based at least in part on historical data collected from at least a relevant subset of the installed base. The historical data is analyzed using machine learning. The what-if simulator module 460 can predict the impact, on system performance and capacity, of using the existing hardware resources such as control unit(s) and/or storage unit(s), and/or of adding additional hardware resources of various quantities. Such a What-If analysis model, can in some examples be used to achieve better optimization using the system resources, and/or to meet SLA targets.

In some examples, the historical data used to build the model includes data associated with the host(s) and/or with the communications network(s). Note that in some examples it may be learned that the network, for example, is a bottleneck, and that adding control units and/or storage units may therefore not improve performance. Similarly, in some examples the model simulates the end to end system performance improvement if the network bottleneck will be resolved, and thus the what-if engine can recommend methods for resolving the network bottleneck (e.g. network reconfiguration and/or re-architecture, additional network components, network upgrade). Similarly, the model can simulate the behavior of specific applications (including database applications) running on a host, based on history data associated with the application, and can then be able to predict the impact on storage performance of e.g. adding such an application.

Storage parameters, such as the remaining time for utilizing of the physical or allocated capacity, latency, IOPs and throughput, can be modeled by machine learning based on historical data. In some examples, ongoing updates are made to the model based on newly received data. These models can be used to perform the What-If analysis.

For example, a physical and allocated capacity consumption machine learning model can be built, based on the historical readings of the physical and allocated capacity of the relevant subset of the installed base.

Another example of creating a What-If analysis model based on machine learning, is a storage latency model, that can be built based on historical readings of the number of VPA control units, model/type of control unity (e.g. CPU and RAM), IOPS, throughput, block size etc., collected from a relevant subset of the installed base.

Note that in some examples a model is continually updated by machine learning, as additional historical data is gathered. Note also that in some examples, the above-disclosed methods for constructing models using machine learning, and predicting performance based on such models, can be utilized also in strategy engine module 450.

As one non-limiting example of simulation, separate what-ifs can be performed for cases where VPA 6 is assigned three CUs, four CUs and five CUs. As a result of these different simulations, the management layer can learn the expected impact of assigning each number of resources to VPAs with performance data similar to that of VPA 6, build a model representing that knowledge, and apply it as rules in future simulations.

Time-dependent performance parameters of the VPA that are based on this modified data may be calculated. Non-limiting examples of such time-dependent performance parameters are latency, IOPS, throughput and resource utilization, all calculated as a function of time. These performance parameters may be compared to those of the requirements of the VPA(s).

In some examples, once the modified historical data is generated, extrapolation into the future can optionally be performed. In such a case the time-dependent performance parameters to be calculated can also include parameters of expected future performance.

In a case where these time-dependent performance parameters are determined to meet the VPA requirements, the proposed storage management strategies may be considered to be valid. These valid proposed storage management strategies may in some examples be referred herein as verified storage management strategies. These verified strategies may be capable of being utilized, e.g. by the orchestrator module 440, in improving VPA performance. For example, the verified storage management strategies may be implemented in a dynamic manner, e.g. by monitoring for compliance with the conditions in the strategy rules and performance of actions when the conditions are complied with. In some examples, a report on validity may be generated.

In a case where the time-dependent performance parameters are determined to not meet the VPA requirements, the proposed storage management strategies may be considered invalid, and not appropriate for use in improving VPA performance. In some examples, a report on non-validity may be generated. This may be output, for example, to strategy engine 450. The details of the report may be capable of being utilized by the strategy engine in performing further analysis, and, based on this analysis, updating, or in some cases abandoning, the proposed strategy.

In some examples, in response to a determination of non-validity of the proposed strategy, additional steps may be performed in the process. A determination may be made, of an additional sub-set of storage resources that would be needed for the proposed storage management strategy to yield a resource performance that meets the VPA requirements. In some examples, a report indicating the additional resources needed, may be output, for example to strategy engine 450. The additional details of this additional-resources report may be capable of being utilized by the strategy engine in performing further analysis, and, based on this analysis, updating, or in some cases abandoning, the proposed strategy. For example, the proposed strategy may be updated such that an action associated with a particular condition may call for re-assignment of five control units, where the original proposed strategy had called for re-assignment of three control units. In some examples, an alert may be sent to another system, and/or a notification sent to a human operator.

As indicated earlier, in some examples the strategy engine module 450, simulator module 460 and orchestrator module 440 may function together to generate new and updated strategies, to verify their validity in terms of meeting VPA requirements, and to implement the verified strategies so as to improve VPA performance by monitoring for compliance with conditions and taking the relevant actions. In some examples, this may be performed autonomously in a dynamic manner.

FIG. 10 presents a series of graphs that illustrate a simple non-limiting example of implementing such a simulation process. In the example, the time-dependent performance parameter that is to be improved is read-write latency. Graph 1005 shows the historical performance data of read-write latency, as curve 1030. The VPA requirement may be an SLA requirement that the value of the latency parameter should be below the value shown by line 1020, e.g. 1 millisecond latency, at least 99% of the time. An analysis of this graph shows that in the periods of time 1035, 1038, 1043, 1048 the latency was above that required. In this example, these periods of time account for 50% of the time, and thus the SLA of 99% is clearly not met.

In the example, strategy engine 450 analyzes this unsatisfactory historical performance data, and generates "Strategy #1", for example using the methods of FIGS. 7-9. The strategy engine then submits Strategy #1 to the what-if simulator 460. The simulator simulates a historical performance history based on the data 1030, but this time applies Strategy #1 to determine "what if". The simulation includes, for example, re-assignment of resources at various points in the historical time, as part of that strategy. The result of this simulation is curve 1060 of graph 1010. It may be seen in this example that the calculated latency performance is overall much lower and improved, because of utilization of the strategy. An analysis of this graph shows that only in the periods of time 1063, 1068 was the latency parameter above the required level. In this example, these periods of time account for 0.8% of the time, the latency is below the required level 1020 during 99.2% of the time, and thus the SLA of 99% is met. The proposed Strategy #1 is determined to be valid and verified, and the strategy engine can for example output it to orchestrator module 440 for implementation.

In another example, curve 1060 is such that the periods of time 1063, 1068 account for 3% of the time, and the latency is thus below the required level 1020 during 97% of the time. Applying the strategy clearly improved the performance (1060 vs 1030), but the SLA of 99% is still not met in this example. Strategy #1 has been found to be not valid. However, in this example, a further step may be performed, e.g. by the simulator. The simulator may then re-run the historical performance data once more, that is once more simulate a historical performance history based on the historical performance data, and apply Strategy #1, but this time it will include in the strategy the addition of one more control unit. The results in this example, may still not meet requirements. The simulator may then perform the simulation still again, and apply Strategy #1, but this time will include in the strategy the addition of two more control units. The results may be curve 1080 of graph 1015. In this curve the latency is below the required level 100% of the time, and thus the SLA of 99% is met. The simulator has determined that an addition of two CUs into proposed Strategy #1 may yield a strategy that meets the requirements. In the example, it outputs this information to strategy engine 450, the strategy engine updates storage management Strategy #1 to include the two CUs, and this updated storage management strategy is output to the orchestrator module 440. There is an increased expectation that implementation of the updated strategy, and performance of the actions in this updated strategy, will meet VPA requirements, since the proposed strategy underwent a simulation and was updated, based on the simulation results.

As indicated earlier, in some examples the strategy engine module 450, simulator module 460 and orchestrator module 440 may function together to generate new and updated strategies, to verify their validity in terms of meeting VPA requirements, and to implement the verified strategies so as to improve VPA performance by monitoring for compliance with conditions and taking the relevant actions. In some examples, this may be performed autonomously in a dynamic manner.

Figure 11:
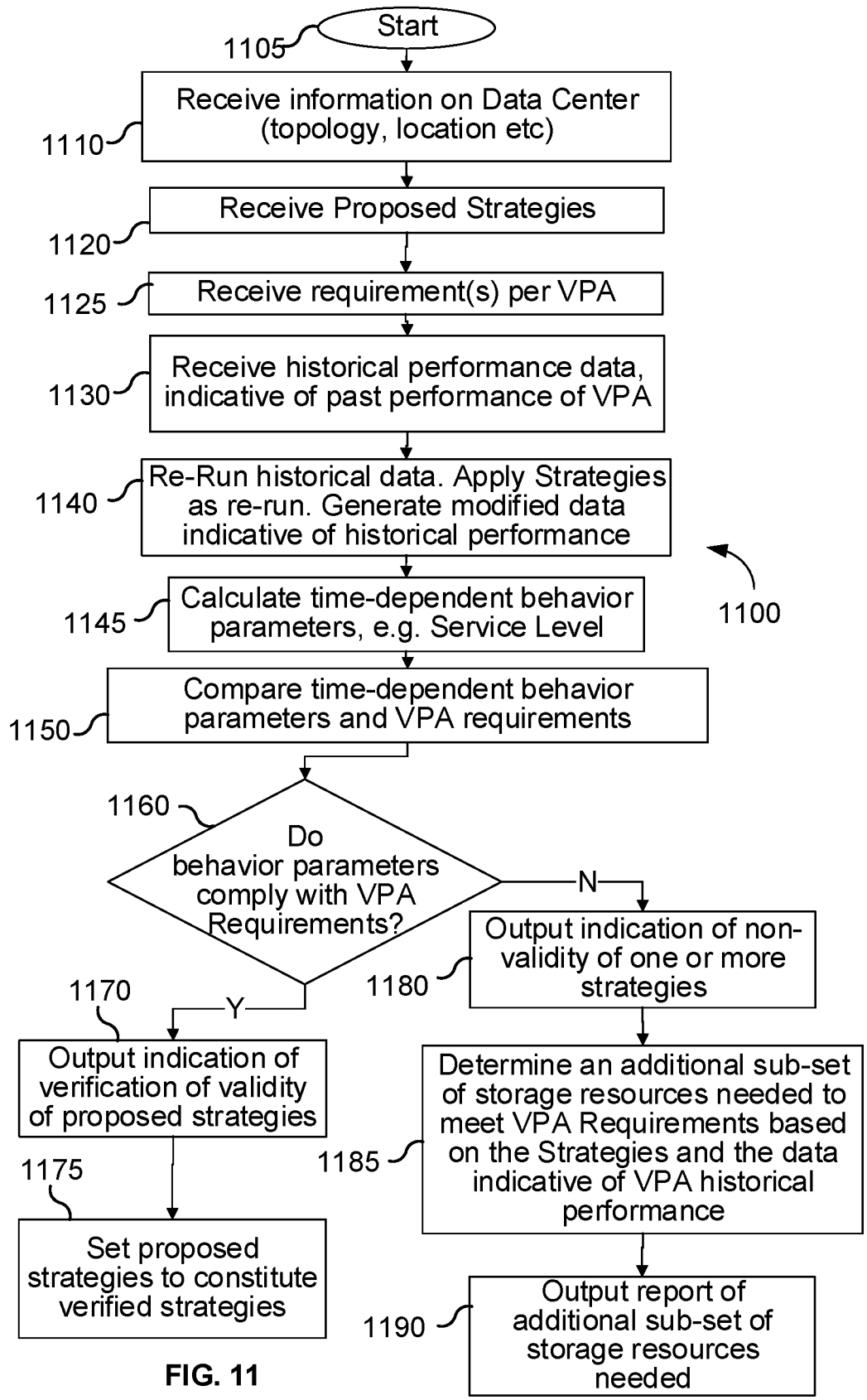
FIG. 11 illustrates a flowchart of a sequence of operations carried out for data storage management according to some examples of the presently disclosed subject matter.

Turning to FIG. 11, it shows a flowchart of operations performed according to some examples of the presently disclosed subject matter. Operations described with reference to FIG. 11 may in some examples be performed by storage management layer 250, and more specifically by what-if simulator module 460 described above. In some examples, the process 1100 may perform methods disclosed with regard to FIG. 10.

The process 1100 may start at block 1105. According to some examples, topology information is received, characterizing one or more VPA(s) that are associated with one or more hosts (block 1110). This may be done e.g. by management layer 250, for example by using the what-if simulator module 460. The topology information may be indicative of the sub-set of the plurality of storage resources (control units and/or storage units) of the VPA that are assigned to provide service to the host(s). In some examples, the topology information may include information indicative of the location of the host(s). This information may be useful in analyzing, for example, the validity of the proposed strategies as they apply to VPAs that serve different geographical areas. This step is optional. In some examples, this information may already be present in the what-if simulator module.

According to some examples, one or more proposed storage management strategies are received (block 1120). This may be done e.g. by what-if simulator module 460. According to some examples, one or more requirements associated with each relevant VPA are received (block 1125). This may be done e.g. by what-if simulator module 460. According to some examples, historical performance data of the VPA(s) are received (block 1130). This may be done e.g. by what-if simulator module 460.

According to some examples, the simulation may be performed again, while applying the one or more proposed storage management to the historical performance data (block 1134). In some examples, the topology information can also be considered in the simulation. This may be done e.g. by what-if simulator module 460. The result of this action may be, in some examples, to generate modified historical performance data. This simulated data may be considered modified, compared to the historical performance data that was input at block 1110, at least in that this data was generated while applying the proposed strategies.

According to some examples, time-dependent performance parameters of the VPA, indicative of the modified historical performance data, are calculated (block 1145). This may be done e.g. by what-if simulator module 460. An example of such time-dependent performance parameters may be the calculated latency, and the calculated Service Level, that are associated with the modified data, as exemplified in graph 1010.

According to some examples, the time-dependent performance parameters of the VPA, indicative of the modified historical performance data, are compared to the requirement(s) of the VPA(s) (block 1150). This may be done e.g. by what-if simulator module 460. This is exemplified in graph 1010 by the comparison of curve 1060 to the 99% requirement that latency be performance line 1020. A determination is made whether or not these time-dependent behavior parameters comply with the VPA requirements (block 1160).

According to some examples, in response to a determination at 1160 that the time-dependent performance parameters of the VPA, indicative of the modified data, meet the requirement(s) of the VPA(s), the one or more proposed storage management strategies may be set to constitute one or more verified storage management strategies (block 1170). This may be done e.g. by what-if simulator module 460.

According to some examples, a report or indication may be generated, indicating verification of the validity of one or more proposed storage management strategies. This report or indication may be output (block 1175). This may be done e.g. by what-if simulator module 460. For example, the report or indication may be output to strategy engine module 450. In some examples, the report may include information indicative of the time-dependent performance parameters of the VPA and VPA requirements.

In some examples, the strategy engine module may then output the now-verified storage management strategy or strategies to orchestrator module 440, which may implement the strategies in the data storage management system in a dynamic manner. The output of the verified storage management strategy, for use by the strategy engine module and by the orchestrator module, is thus an example of performing an action to implement the verified storage management strategy in the data storage management system 150 in a dynamic manner. The verified storage management strategy is thus capable of being utilized by these modules to perform this action.

According to some examples, in response to a determination at 1160 that the time-dependent performance parameters of the VPA, indicative of the modified data, do not meet the requirement(s) of the VPA(s), a report may be generated, indicating non-validity of the one or more storage management strategies (block 1180). This may be done e.g. by what-if simulator module 460. This report indicating non-validity is capable of being utilized by management layer 250 to perform actions to update the proposed storage management strategy. For example, the report of non-validity may be output to the strategy engine, which may then perform additional analysis and update the proposed strategy, for example as disclosed with regard to FIG. 10.

According to some examples, in response to a determination of non-validity of the proposed strategy at block 1160, additional steps may be performed in the process. These may be done before, after, in parallel with, or instead of block 1180. A determination may be made (block 1185), of an additional sub-set of storage resources that would be needed in order for the proposed storage management strategy to yield a resource performance that meets the VPA requirements. The determination may be made based on the proposed storage management strategies and on the historical performance data. This may be done e.g. by what-if simulator module 460.

According to some examples, a report indicating the additional sub-set of storage resources needed by the VPAs may be output (block 1190). This output may be performed e.g. by what-if simulator module 460. It may be output for example to strategy engine 450. In some examples, the report may include information indicative of the time-dependent performance parameters of the VPA and VPA requirements.

This report may be capable of being utilized by the management layer to perform an action to update the proposed storage management strategies. For example, the strategy engine may utilize the report to perform further analysis, and, based on this analysis, may update a proposed strategy. In some cases, the strategy engine may instead abandon a proposed strategy, based on the report, and generate an entirely new strategy.

Note that the division of functionality between what-if simulator module 460 and strategy engine 450 disclosed herein is one non-limiting example. In other examples, the strategy engine module may be configured with logic that allows it to perform what-if simulation and to verify whether the strategies it generates are valid or not. Similarly, in some examples the enrichment data parameters and/or the interrupt event enrichment data parameters may be input to the what-if simulator module as well as to the strategy engine, to be utilized for example in the analysis performed in block 1140.

The above exposition discloses example uses of the simulator module 460 for dynamically verifying proposed storage management strategies and possible suggesting changes in the number of resources, for use by the strategy engine 450, in some cases to enable the strategy engine to output to orchestrator module 440 validated strategies, that are in some cases more likely to succeed.

In some other examples, the simulator module 460 may receive its input (e.g. proposed storage management strategies and/or VPA requirements) from a system external to management layer 250, for example via the external interface module 470, in some cases receiving the input in an automated manner. Similarly, in some examples, the generated reports, whether indicative of validity or non-validity of proposed storage management strategies, may be output to such external systems. In such cases, the simulator module may be capable of providing simulation services to other data storage management systems.

In still other examples, the what-if simulator engine may be used instead as a tool for operators. In such cases, the management layer 250 may be configured with a user interface to allow interactive operation with a human operator. For example, in some cases the operator may input, utilizing a user interface, one or more proposed storage management strategies for VPA(s), or requirement(s) of the VPAs, or both. Another input may be a number of resources to be assigned. The what-if simulator may in some examples also calculate time-dependent performance parameters of the VPA associated with the historical performance data. As part of generating the reports of blocks 1175, 1180, 1190, the simulator module may output to a display, visible to the operator, time-dependent performance parameters associated with historical performance data, time-dependent performance parameters of the VPA associated with the modified historical performance data (possibly for cases with and without a modification of the number of resources), and/or the VPA requirements. In some cases, this display may be in the form of graphs such as those of FIG. 10. This can be repeated, until strategies, and numbers of resources, are identified that will best meet VPA requirements.

According to some examples, both strategy engine 450 and simulator module 460 may be configured to enable interactive work with an operator. In such cases, the strategy engine may for example output to the user proposed strategies, along with, for example, the SLA that the strategies are predicted to provide, and for example the number of resources that the strategy is configured to add to a particular VPA. The operator may for example enter these strategies into the simulator module, to see more detailed data (e.g. graphs) on expected performance of the strategy. The operator may in some examples be able to interact with the simulator module, for example varying the number of resources that will be allocated to the strategy (adding or subtracting resources from a strategy), and seeing "what if", that is how the performance is predicted to be affected. In some cases, such a simulation may guide the operator to purchase additional resources, or to move resources from another data storage system.

In some examples, an input to the what-if simulator 460 is information on changes or updates in the applications of the host(s) which is served by the particular VPA. As disclosed with regard to FIG. 7, non-limiting examples include a human resources application in the case of a corporate merger, and the addition of instances of a database to be run on the relevant host. Another example input is whether a new VPA will be set up for these additional instances, or to support the additional employees, or whether the existing VPA will serve them. The Simulator can be used in such examples to determine whether existing strategies will support the new configuration, how additional resources can assist in meeting the VPA requirements etc. In some examples, this can be done interactively between a human operator and the what if simulator module 460. In some examples, the information on application changes or updates is input automatically as an enrichment data parameter.

In some cases, there may be example advantages in implementing methods such as those disclosed with regard to FIGS. 10-11. There may be advantages in verifying storage management strategies in a dynamic manner, in some cases in near-real time, based on analysis of VPA requirements, historical performance data and/or various types of enrichment data. Such analysis may in some examples result in strategies which are validated by an additional analysis, and that may therefore be more likely to enable the particular VPA(s) to meet its requirements. This may thus have the effect of improving the overall performance of the VPA. In addition, the simulator may output suggestions for modifying the number of resources associated with a particular strategy. The validation and the suggestions for modifying resource quantity may result in a more optimized utilization of resources than may other methodologies for generating strategies, that may be based on a less comprehensive analysis.

It should be noted that the word "comprising" as used throughout the appended claims is to be interpreted to mean "including but not limited to".

In the claims that follow, alphanumeric characters and Roman numerals used to designate claim elements are provided for convenience only, and do not imply any particular order of performing the elements.

While there has been shown and disclosed examples in accordance with the presently disclosed subject matter, it will be appreciated that many changes may be made therein without departing from the spirit of the presently disclosed subject matter.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a computer-readable non-transitory memory tangibly embodying a program of instructions executable by the computer for performing the method of the presently disclosed subject matter. The term "non-transitory" is used herein to exclude transitory, propagating signals, but to otherwise include any volatile or non-volatile computer memory technology suitable to the application.

It is also to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

We claim:

1. A data storage management layer, comprising:
at least one computing device, operatively connected over a communication network to a plurality of storage resources, the plurality of storage resources comprising at least one data storage unit and at least one control unit, the at least one data storage management layer comprised in, or otherwise operatively connected to, the plurality of storage resources, the data storage management layer and the plurality of storage resources constituting a data storage system, the at least one data storage management layer and the at least one control unit operatively connected over the communication network to at least one host computer device, wherein a sub-set of the plurality of storage resources are assigned to the at least one host, in order to provide storage services thereto according to performance requirements predefined for the at least one host, thereby generating at least one Virtual Private Array (VPA) associated with the at least one host, the sub-set comprising the at least one control unit and the at least one data storage unit,
the at least one computing device comprising a processing circuitry, the processing circuitry configured to perform a method of managing the data storage system, the method comprising:
(a) implement at least one storage management strategy, comprising at least one rule, the at least one rule comprising at least one condition and at least one action, the at least one action capable of improving the VPA performance in a dynamic manner; and
(b) repetitively performing the following:
  i) monitor the VPA performance for detection of compliance of the VPA with the at least one condition; and
  ii) responsive to detection of compliance of the VPA with the at least one condition, performing the at least one action capable of improving the VPA performance,
wherein the at least one action comprises at least one resources re-assignment action, the at least one resources re-assignment action comprising re-assignment of at least one of: the at least one control unit; and the at least one data storage unit, and
wherein the at least one resources re-assignment action comprises at least one of: re-assigning at least one unit of the plurality of storage resources from the at least one VPA to a free pool; re-assigning the at least one unit from the free pool to the at least one VPA; and re-assigning the at least one unit from the at least one VPA to at least one other VPA.

2. The data storage management layer of claim 1, wherein improving the VPA performance comprises at least one of: decreasing read-write latency; increasing Input/Output Operations per Second (IOPS); increasing throughput; increase free physical capacity; increase free logical capacity; increase data reduction ratio; decreasing CPU utilization; decreasing storage utilization; and decreased utilization of the at least one communications network.

3. The data storage management layer of claim 1, wherein the at least one resources re-assignment action comprises:
  i. generating at least one computer instruction for the at least one resources re-assignment action; and
  ii. sending the at least one computer instruction to the at least one control unit associated with the at least one host for causing the control unit to execute the re-assignment action.

4. The data storage management layer of claim 1, wherein the at least one resources re-assignment action comprises a determination of a number of data storage units to re-assign, a determination of a number of control units to re-assign and a determination of an identity of the at least one other VPA.

5. The data storage management layer of claim 1, wherein the at least one resources re-assignment action comprises increasing the sub-set of the plurality of storage resources assigned to the at least one host.

6. The data storage management layer of claim 1, wherein the at least one resources re-assignment action comprises decreasing the sub-set of the plurality of storage resources assigned to the at least one host.

7. The data storage management layer claim 1, wherein the at least one resources re-assignment action comprises generating updated topology information characterizing the at least one VPA.

8. The data storage management layer of claim 1, wherein the at least one action comprises at least one of sending an alert to a control center, sending a communication to the at least one host, and performing an action to re-configure the at least one communication network.

9. The data storage management layer of claim 1, wherein the at least one condition comprises a time-based condition.

10. The data storage management layer of claim 1, wherein the at least one condition is based on at least one of: read-write latency; Input/Output Operations per Second (IOPS); throughput; physical capacity; logical; data reduction ratio; CPU utilization; storage utilization; and utilization of the at least one communications network.

11. The data storage management layer of claim 1, wherein the at least one communications network is at least one of: an Ethernet; and an NVME over Fabric network.

12. The data storage management layer of claim 1 wherein the at least one action capable of improving VPA performance is performed autonomously.

13. The data storage management layer of claim 1, wherein the at least one action capable of improving VPA performance is performed in response to confirmation by an operator.

14. The data storage management layer of claim 1, wherein step (b) further comprises: in response to the data storage management layer receiving at least one storage management strategy update, comprising at least one updated rule, the at least one updated rule comprising at least one updated condition and at least one updated action capable of improving the VPA performance in a dynamic manner,
  monitoring the VPA performance for detection of compliance of the VPA with the at least one updated condition.

15. The data storage management layer of claim 1, wherein the at least one storage management strategy comprises at least one manually-input storage management strategy.

16. The data storage management layer of claim 1, wherein the performing of the at least one action capable of improving the VPA performance comprises:
  iii) choosing at least one candidate action of the at least one action;
  iv) determining whether the at least one candidate action can be implemented; and
  v) in response to a determination that the at least one candidate action can be implemented, performing the at least one candidate action.

17. The data storage management layer of claim 1, wherein said step (a) comprising:

(g) receiving at least one requirement of the at least one VPA;
(h) receiving historical performance data;
(i) analyzing the historical performance data, based on the at least one requirement of a VPA;
(j) generating, based on the analysis, at least one storage management strategy, comprising at least one rule, the at least one rule comprising at least one condition and at least one action capable of improving the VPA performance in a dynamic manner, wherein each storage management strategy of the at least one storage management strategy is indicative of a requirement of the least one requirement.

18. A data storage management layer, comprising:
at least one computing device, operatively connected over a communication network to a plurality of storage resources, the plurality of storage resources comprising at least one data storage unit and at least one control unit, the at least one data storage management layer comprised in, or otherwise operatively connected to, the plurality of storage resources, the data storage management layer and the plurality of storage resources constituting a data storage system, the at least one data storage management layer and the at least one control unit operatively connected over the communication network to at least one host computer device, wherein a sub-set of the plurality of storage resources are assigned to the at least one host, in order to provide storage services thereto according to performance requirements predefined for the at least one host, thereby generating at least one Virtual Private Array (VPA) associated with the at least one host, the sub-set comprising the at least one control unit and the at least one data storage unit,
the at least one computing device comprising a processing circuitry, the processing circuitry configured to perform a method of generating data storage strategies for the data storage management system, the method comprising:
(a) receiving at least one requirement of the at least one VPA, wherein the at least one requirement of a VPA is indicative of at least one Service Level Agreement (SLA), wherein the at least one requirement of a VPA is indicative of at least one of a storage service performance requirement and a resource utilization requirement;
(b) receiving historical performance data, which is indicative of the past performance of the at least one VPA;
(c) analyzing the historical performance data, based on the at least one requirement of a VPA;
(d) generating, based on the analysis, at least one storage management strategy, comprising at least one rule, the at least one rule comprising at least one condition and at least one action capable of improving the VPA performance in a dynamic manner, wherein each storage management strategy of the at least one storage management strategy is indicative of a requirement of the least one requirement; and
(e) output the at least one storage management strategy, wherein the at least one storage management strategy is capable of being utilized by the at least one data storage management layer to perform an action to implement the at least one storage management strategy in the data storage management system in a dynamic manner.

19. The data storage management layer of claim 18, wherein the analysis of the historical performance data, and the generation of the at least one storage management strategy, are performed utilizing machine learning.

20. The data storage management layer of claim 18, wherein the at least one requirement of a VPA is time-dependent.

21. The data storage management layer of claim 18, the method further comprising receiving at least one initial storage management strategy,
   wherein the analysis of the historical performance data is based on the at least one initial storage management strategy,
   wherein the generating of the at least one storage management strategy is based on the at least one initial storage management strategy.

22. The data storage management layer of claim 18, wherein the analysis, and the generating of the storage management strategy, are based on requirements of one VPA of the at least one VPA.

23. The data storage management layer of claim 18, wherein the analysis, and the generating of the storage management strategy, are based on requirements of all VPAs of the at least one VPA, wherein the at least one storage management strategy comprises at least one storage management strategy that addresses the requirements of all VPAs of the at least one VPA.

24. The data storage management layer of claim 18, wherein the at least one storage management strategy comprises an ordered set of storage management strategies, wherein the ordered set is ordered from a highest-priority storage management strategy to a lowest-priority storage management strategy.

25. The data storage management layer of claim 18, the method further comprising receiving at least one enrichment data parameter, wherein the analyzing of the historical performance data is based on the at least one enrichment data parameter, and the generating of the at least one storage management strategy is indicative of the at least one enrichment data parameter.

26. The data storage management layer of claim 25, wherein the at least one enrichment data parameter is indicative of a pre-defined time-based event.

27. The data storage management layer of claim 25, wherein the at least one enrichment data parameter is a machine-learned parameter.

28. The data storage management layer of claim 18, the method further comprising receiving at least one interrupt event enrichment data parameter, wherein the analyzing of the historical performance data is based on the at least one interrupt event enrichment data parameter, and the generating of the at least one storage management strategy is indicative of the at least one interrupt event enrichment data parameter.

29. The data storage management layer of claim 28, wherein the at least one interrupt event enrichment data parameter is indicative of an event occurring in one of real-time and near-real-time.

30. The data storage management layer of claim 18, the method further comprising:
   repetitively performing the following:
      receiving at least one update of the historical performance data; and
      performing said steps (a) through (c), wherein the analyzing of the historical performance data is based on the at least one update, and the generating of the at least one storage management strategy is indicative of the at least one update of the historical performance data, wherein the generating of the at least one storage management strategy comprises at least one of generating at least one new storage management strategy and generating at least one storage management strategy update, and setting the at least one of the at least one new storage management strategy and the at least one storage management strategy update to constitute the at least one storage management strategy, wherein the at least one storage management strategy update comprises at least one updated rule, the at least one updated rule comprising at least one updated condition and at least one updated action.

31. The data storage management layer of claim 18, the method further comprising:
   repetitively performing the following:
      monitoring the VPA performance for detection of compliance of the VPA with the at least one condition of the at least one storage management strategy; and
      responsive to detection of compliance of the VPA with the at least one condition, performing the at least one action capable of improving the VPA performance.

32. A data storage management layer, comprising:
   at least one computing device, operatively connected over a communication network to a plurality of storage resources, the plurality of storage resources comprising at least one data storage unit and at least one control unit, the at least one data storage management layer comprised in, or otherwise operatively connected to, the plurality of storage resources, the data storage management layer and the plurality of storage resources constituting a data storage system, the at least one data storage management layer and the at least one control unit operatively connected over the communication network to at least one host computer device, wherein a sub-set of the plurality of storage resources are assigned to the at least one host, in order to provide storage services thereto according to performance requirements predefined for the at least one host, thereby generating at least one Virtual Private Array (VPA) associated with the at least one host, the sub-set comprising the at least one control unit and the at least one data storage unit,
   the at least one computing device comprising a processing circuitry, the processing circuitry configured to perform a method of generating data storage strategies for the data storage management system, the method comprising:
      (a) receiving at least one requirement of the at least one VPA;
      (b) receiving historical performance data, which is indicative of the past performance of the at least one VPA;
      (c) analyzing the historical performance data, based on the at least one requirement of a VPA;
      (d) generating, based on the analysis, at least one storage management strategy, comprising at least one rule, the at least one rule comprising at least one condition and at least one action capable of improving the VPA performance in a dynamic manner, wherein each storage management strategy of the at least one storage management strategy is indicative of a requirement of the least one requirement;
      (e) setting the at least one storage management strategy to constitute at least one proposed storage management strategy;
      (f) simulating a historical performance history based on the historical performance data to generate modified historical performance data, wherein the simulation comprises applying the at least one proposed storage management strategy to the historical performance data;
(g) calculating time-dependent performance parameters of the VPA indicative of the modified historical performance data;
(h) comparing the time-dependent performance parameters of the VPA indicative of the modified historical performance data to the at least one requirement of the at least one VPA;
(i) in response to the time-dependent performance parameters of the VPA indicative of the modified historical performance data meeting the at least one requirement of the at least one VPA, performing the following:
  i. outputting a report indicating verification of the validity of the at least one proposed storage management strategy; and
  ii. setting the at least one proposed storage management strategy to constitute at least one storage management strategy; and
(j) outputting the at least one storage management strategy, wherein the at least one storage management strategy is capable of being utilized by the at least one data storage management layer to perform an action to implement the at least one storage management strategy in the data storage management system in a dynamic manner.

33. A data storage management layer, comprising:
at least one computing device, operatively connected over a communication network to a plurality of storage resources, the plurality of storage resources comprising at least one data storage unit and at least one control unit, the at least one data storage management layer comprised in, or otherwise operatively connected to, the plurality of storage resources, the data storage management layer and the plurality of storage resources constituting a data storage system, the at least one data storage management layer and the at least one control unit operatively connected over the communication network to at least one host computer device, wherein a sub-set of the plurality of storage resources are assigned to the at least one host, in order to provide storage services thereto according to performance requirements predefined for the at least one host, thereby generating at least one Virtual Private Array (VPA) associated with the at least one host, the sub-set comprising the at least one control unit and the at least one data storage unit,
the at least one computing device comprising a processing circuitry, the processing circuitry configured to perform a method of managing the data storage management system, the method comprising:
(a) receiving at least one requirement of the at least one VPA;
(b) receiving historical performance data, which is indicative of the past performance of the at least one VPA;
(c) analyzing the historical performance data, based on the at least one requirement of a VPA;
(d) generating, based on the analysis, least one storage management strategy, comprising at least one rule, the at least one rule comprising at least one condition and at least one action, wherein each storage management strategy of the at least one storage management strategy is indicative of a requirement of the least one requirement, the at least one storage management strategy constituting an at least one storage management strategy;
(e) setting the at least one storage management strategy to constitute at least one proposed storage management strategy;
(f) simulating a historical performance history based on the historical performance data to generate modified historical performance data, wherein the simulation comprises applying the at least one proposed storage management strategy to the historical performance data;
(g) calculating time-dependent performance parameters of the VPA indicative of the modified historical performance data;
(h) comparing the time-dependent performance parameters of the VPA indicative of the modified historical performance data to the at least one requirement of the at least one VPA;
(i) in response to the time-dependent performance parameters of the VPA indicative of the modified historical performance data meeting the at least one requirement of the at least one VPA, performing the following:
  i) outputting a report indicating verification of the validity of the at least one proposed storage management strategy; and
  ii) setting the at least one proposed storage management strategy to constitute at least one storage management strategy; and
(j) repetitively performing the following:
  i) monitoring the VPA performance for detection of compliance of the VPA with the at least one condition; and
  ii) responsive to detection of compliance of the VPA with the at least one condition, performing the at least one action capable of improving the VPA performance.

34. A data storage management layer, comprising:
at least one computing device, operatively connected over a communication network to a plurality of storage resources, the plurality of storage resources comprising at least one data storage unit and at least one control unit, the at least one data storage management layer comprised in, or otherwise operatively connected to, the plurality of storage resources, the data storage management layer and the plurality of storage resources constituting a data storage system, the at least one data storage management layer and the at least one control unit operatively connected over the communication network to at least one host computer device, wherein a sub-set of the plurality of storage resources are assigned to the at least one host, in order to provide storage services thereto according to performance requirements predefined for the at least one host, thereby generating at least one Virtual Private Array (VPA) associated with the at least one host, the sub-set comprising the at least one control unit and the at least one data storage unit,
the at least one computing device comprising a processing circuitry, the processing circuitry configured to perform a method of managing the data storage system, the method comprising:
(a) receiving at least one proposed storage management strategy;
(b) receiving at least one requirement of the at least one VPA;
(c) receiving historical performance data, which is indicative of the past performance of the at least one VPA;
(d) simulating a historical performance history based on the historical performance data to generate modified historical performance data, wherein the simulation comprises applying the at least one proposed storage management strategy to the historical performance data;

(e) calculating time-dependent performance parameters of the VPA indicative of the modified historical performance data;

(f) comparing the time-dependent performance parameters of the VPA indicative of the modified historical performance data to the at least one requirement of the at least one VPA;

(g) in response to the time-dependent performance parameters of the VPA indicative of the modified historical performance data meeting the at least one requirement of the at least one VPA,
  i) generating a report indicating verification of validity of the at least one proposed storage management strategy; and
  ii) setting the at least one proposed storage management strategy to constitute at least one verified storage management strategy,
wherein the at least one verified storage management strategy is capable of being utilized by the at least one data storage management layer to perform an action to implement the at least one verified storage management strategy in the data storage management system in a dynamic manner.

35. The data storage management layer of claim 34, further comprising outputting a report, the report indicative of the time-dependent performance parameters of the VPA indicative of the modified historical performance data, the report indicative of the at least one requirement of the at least one VPA.

36. The data storage management layer of claim 35, the method further comprising:
  calculating time-dependent performance parameters of the VPA associated with the data indicative of historical performance data,
  wherein the outputting of the report comprises outputting to a display the time-dependent performance parameters of the VPA associated with the historical performance data, the time-dependent performance parameters of the VPA indicative of the modified historical performance data and the at least one requirement of the at least one VPA, the display enabling parameter comparisons.

37. The data storage management layer of claim 34, wherein at least one of the receiving of: at least one proposed storage management strategy; and the receiving of the at least one requirement of the at least one VPA, are performed utilizing a user interface.

38. The data storage management layer of claim 34, wherein at least one of the receiving of the at least one of the at least one proposed storage management strategy and the receiving of the at least one requirement of the at least one VPA is from an external system utilizing an automated interface.

39. The data storage management layer of claim 34, wherein the report indicating verification of the validity of the at least one proposed storage management strategy is output to an external system.

40. The data storage management layer of claim 34, wherein the simulating the historical performance history is performed utilizing machine learning.

41. The data storage management layer of claim 34, wherein the method further comprising:

i) determining an additional sub-set of storage resources needed to meet the at least one requirement of the at least one VPA, based on the at least one proposed storage management strategy and based on the historical performance data; and ii) outputting a report of the additional sub-set of storage resources needed, wherein the report of the additional sub-set of storage resources needed is capable of being utilized by the at least one data storage management layer to perform an action to update the at least one proposed storage management strategy.

42. The data storage management layer of claim 34, wherein in response to the time-dependent performance parameters of the VPA indicative of the modified data historical performance data not meeting the at least one requirement of the at least one VPA, generating a report indicating non-validity of the at least one proposed storage management strategy,
  wherein the report indicating non-validity of the at least one proposed storage management strategy is capable of being utilized by the at least one data storage management layer to perform an action to update the at least one proposed storage management strategy.

43. The data storage management layer of claim 17, wherein the analyzing of the historical performance data is based on topology information characterizing the at least one VPA.

44. A data storage system, comprising:
  the at least one VPA, comprising the at least one control unit and the at least one data storage unit; and
  the data storage management layer of claim 1.

45. A computer-implemented method of managing a data storage system, the data storage system comprising a plurality of storage resources and at least one data storage management layer operatively connected therebetween over at least one communication network, the plurality of storage resources comprising at least one data storage unit and at least one control unit, the at least one data storage management layer comprised in, or otherwise operatively connected to, the plurality of storage resources, data storage management layer comprised in otherwise operatively connected to the plurality of storage resources, the at least one data storage management layer and the at least one control unit operatively connected over the at least one communication network to at least one host computer device,
  wherein a sub-set of the plurality of storage resources are assigned to the at least one host, in order to provide storage services thereto according to performance requirements predefined for the at least one host, thereby generating at least one Virtual Private Array (VPA) associated with the at least one host,
  the method comprising, using a processing circuitry of the at least one data storage management layer for:
  (a) implementing at least one storage management strategy, comprising at least one rule, the at least one rule comprising at least one condition and at least one action, the at least one action capable of improving VPA performance in a dynamic manner; and
  (b) repetitively performing the following:
    i) monitoring the VPA performance of the at least one VPA for detection of compliance of the at least one VPA with the at least one condition; and
    ii) responsive to detection of compliance of the VPA with the at least one condition, performing the at least one action capable of improving the VPA performance, wherein the at least one action comprises at least one resources re-assignment action, the at least one resources re-assignment action comprising re-assignment of at least one of: the at least one control unit and the at least one data storage unit, wherein the at least one resources re-assignment action comprises at least one of: re-assigning at least one unit of the plurality of storage resources from the at least one VPA to a free pool; re-assigning the at least one unit from the free pool to the at least one VPA; and re-assigning the at least one unit from the at least one VPA to at least one other VPA.

46. A non-transitory computer readable storage medium tangibly embodying a program of instructions that, when executed by a computer device comprising a processing circuitry, cause the computer to perform a method of managing a data storage system, the computer device constituting at least one data storage management layer, the data storage system comprising a plurality of storage resources and the at least one data storage management layer operatively connected over a communication network, the plurality of storage resources comprising at least one data storage unit and at least one control unit, the at least one data storage management layer comprised in, or otherwise operatively connected to, the plurality of storage resources, the at least one data storage management layer and the at least one control unit operatively connected over the communication network to at least one host computer device, wherein a sub-set of the plurality of storage resources are assigned to the at least one host, in order to provide storage services thereto according to performance requirements predefined for the at least one host, thereby generating at least one Virtual Private Array (VPA) associated with the at least one host, the method comprising:
(a) implementing at least one storage management strategy, comprising at least one rule, the at least one rule comprising at least one condition and at least one action, the at least one action capable of improving the VPA performance in a dynamic manner;
(b) repetitively performing the following:
  i) monitoring the VPA performance for detection of compliance of the VPA with the at least one condition; and
  ii) responsive to detection of compliance of the VPA with the at least one condition, performing the at least one action capable of improving the VPA performance, wherein the at least one action comprises at least one resources re-assignment action, the at least one resources re-assignment action comprising re-assignment of at least one of: the at least one control unit and the at least one data storage unit, wherein the at least one resources re-assignment action comprises at least one of: re-assigning at least one unit of the plurality of storage resources from the at least one VPA to a free pool; re-assigning the at least one unit from the free pool to the at least one VPA; and re-assigning the at least one unit from the at least one VPA to at least one other VPA.

* * * * *